(12) United States Patent
Yang et al.

(10) Patent No.: US 12,484,045 B2
(45) Date of Patent: Nov. 25, 2025

(54) STATE CHANGES ASSOCIATED WITH A CONFIGURED GRANT TRANSMISSION OF A PLURALITY OF TRANSPORT BLOCKS

(71) Applicant: QUALCOMM Incorporated, San Diego, CA (US)

(72) Inventors: Wei Yang, San Diego, CA (US); Mostafa Khoshnevisan, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/163,661

(22) Filed: Feb. 2, 2023

(65) Prior Publication Data

US 2023/0354303 A1 Nov. 2, 2023

Related U.S. Application Data

(60) Provisional application No. 63/363,938, filed on Apr. 29, 2022.

(51) Int. Cl.
*H04W 72/1263* (2023.01)
*H04L 1/00* (2006.01)
*H04W 72/11* (2023.01)
*H04W 72/23* (2023.01)

(52) U.S. Cl.
CPC ....... *H04W 72/1263* (2013.01); *H04L 1/0003* (2013.01); *H04W 72/11* (2023.01); *H04W 72/23* (2023.01)

(58) Field of Classification Search
CPC ..... H04L 1/0003; H04W 72/23; H04W 72/11; H04W 72/1263
See application file for complete search history.

(56) References Cited

U.S. PATENT DOCUMENTS

| | | | |
|---|---|---|---|
| 2013/0182653 A1* | 7/2013 | Earnshaw | H04L 1/1822 370/329 |
| 2014/0161069 A1* | 6/2014 | Ohta | H04L 5/0053 370/329 |
| 2014/0204888 A1* | 7/2014 | Chung | H04L 5/0053 370/329 |
| 2018/0160445 A1* | 6/2018 | Babaei | H04W 72/044 |

(Continued)

FOREIGN PATENT DOCUMENTS

| | | |
|---|---|---|
| EP | 3820224 A1 | 5/2021 |
| EP | 3945745 A1 | 2/2022 |

OTHER PUBLICATIONS

International Search Report and Written Opinion—PCT/US2023/018867—ISA/EPO—Jul. 6, 2023.

(Continued)

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration corresponding to a configured grant (CG), wherein the CG is associated with a CG transmission comprising a plurality of transport blocks (TBs). The UE may receive a downlink control information (DCI) transmission comprising at least one state change indication corresponding to at least one state change associated with the CG transmission. Numerous other aspects are described.

15 Claims, 9 Drawing Sheets

(56) References Cited

U.S. PATENT DOCUMENTS

| | | | | |
|---|---|---|---|---|
| 2020/0053769 A1* | 2/2020 | Vos | ............... | H04W 72/23 |
| 2020/0337083 A1* | 10/2020 | Loehr | ............... | H04W 72/1263 |
| 2020/0389280 A1* | 12/2020 | Li | ............... | H04L 1/1896 |
| 2021/0100024 A1* | 4/2021 | Bang | ............... | H04L 5/0051 |
| 2021/0144743 A1* | 5/2021 | Rastegardoost | ...... | H04W 72/23 |
| 2021/0168836 A1* | 6/2021 | Takeda | ............... | H04W 72/1263 |
| 2021/0273771 A1* | 9/2021 | Takeda | ............... | H04L 5/001 |
| 2022/0094484 A1* | 3/2022 | Babaei | ............... | H04W 72/1263 |
| 2022/0346104 A1* | 10/2022 | Yi | ............... | H04W 72/56 |
| 2022/0386363 A1* | 12/2022 | Ying | ............... | H04L 1/1896 |
| 2023/0044594 A1* | 2/2023 | Wang | ............... | H04L 1/1822 |
| 2023/0088550 A1* | 3/2023 | Wang | ............... | H04L 1/1822 |
| | | | | 370/329 |
| 2023/0231663 A1* | 7/2023 | Lunttila | ............... | H04W 28/04 |
| | | | | 370/330 |
| 2024/0187824 A1* | 6/2024 | Wu | ............... | H04W 4/06 |
| 2024/0188077 A1* | 6/2024 | Ye | ............... | H04W 72/11 |
| 2024/0349277 A1* | 10/2024 | Singh | ............... | H04W 72/1268 |

OTHER PUBLICATIONS

Zte, et al., "Physical Layer Aspects on SPS in NB-IoT", 3GPP TSG RAN WG1 Meeting #90bis, R1-1717205, 3rd Generation Partnership Project (3GPP), Mobile Competence Centre, 650, Route Des Lucioles, F-06921 Sophia-Antipolis Cedex, France, vol. RAn WG1, No. Prague, Czechia, Oct. 9-Oct. 13, 2017, Oct. 8, 2017, 3 Pages, XP051340396, section 2 "Considerations on SPS design in connected state".

\* cited by examiner

STATE CHANGES ASSOCIATED WITH A CONFIGURED GRANT TRANSMISSION OF A PLURALITY OF TRANSPORT BLOCKS

CROSS-REFERENCE TO RELATED APPLICATION

This patent application claims priority to U.S. Provisional Patent Application No. 63/363,938, filed on Apr. 29, 2022, entitled "STATE CHANGES ASSOCIATED WITH A CONFIGURED GRANT TRANSMISSION OF A PLURALITY OF TRANSPORT BLOCKS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for state changes associated with a configured grant transmission of a plurality of transport blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration corresponding to a configured grant (CG), wherein the CG is associated with a CG transmission comprising a plurality of transport blocks (TBs). The method may include receiving a downlink control information (DCI) transmission comprising at least one state change indication corresponding to at least one state change associated with the CG transmission.

Some aspects described herein relate to a method of wireless communication performed by a network node. The method may include transmitting a configuration corresponding to a CG, wherein the CG is associated with a CG transmission comprising a plurality of TBs. The method may include transmitting a DCI transmission comprising at least one state change indication corresponding to at least one state change associated with the CG transmission.

Some aspects described herein relate to a UE for wireless communication. The user equipment may include a memory and one or more processors coupled to the memory. The one or more processors may be configured to receive a configuration corresponding to a CG, wherein the CG is associated with a CG transmission comprising a plurality of TBs. The one or more processors may be configured to receive a DCI transmission comprising at least one state change indication corresponding to at least one state change associated with the CG transmission.

Some aspects described herein relate to a network node for wireless communication. The network node may include a memory and one or more processors coupled to the memory. The one or more processors may be configured to transmit a configuration corresponding to a CG, wherein the CG is associated with a CG transmission comprising a plurality of TBs. The one or more processors may be configured to transmit a DCI transmission comprising at least one state change indication corresponding to at least one state change associated with the CG transmission.

Some aspects described herein relate to a non-transitory computer-readable medium that stores a set of instructions for wireless communication by a UE. The set of instructions, when executed by one or more processors of the UE, may cause the UE to receive a configuration corresponding to a CG, wherein the CG is associated with a CG transmission comprising a plurality of TBs. The set of instructions, when executed by one or more processors of the UE, may cause the UE to receive a DCI transmission comprising at least one state change indication corresponding to at least one state change associated with the CG transmission.

Some aspects described herein relate to a non-transitory computer-readable medium that stores a set of instructions for wireless communication by a network node. The set of instructions, when executed by one or more processors of the network node, may cause the network node to transmit a configuration corresponding to a CG, wherein the CG is associated with a CG transmission comprising a plurality of TBs. The set of instructions, when executed by one or more processors of the network node, may cause the network node to transmit a DCI transmission comprising at least one state change indication corresponding to at least one state change associated with the CG transmission.

Some aspects described herein relate to an apparatus for wireless communication. The apparatus may include means for receiving a configuration corresponding to a CG, wherein the CG is associated with a CG transmission comprising a plurality of TBs. The apparatus may include means for receiving a DCI transmission comprising at least one state change indication corresponding to at least one state change associated with the CG transmission.

Some aspects described herein relate to an apparatus for wireless communication. The apparatus may include means for transmitting a configuration corresponding to a CG, wherein the CG is associated with a CG transmission comprising a plurality of TBs. The apparatus may include means for transmitting a DCI transmission comprising at least one state change indication corresponding to at least one state change associated with the CG transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
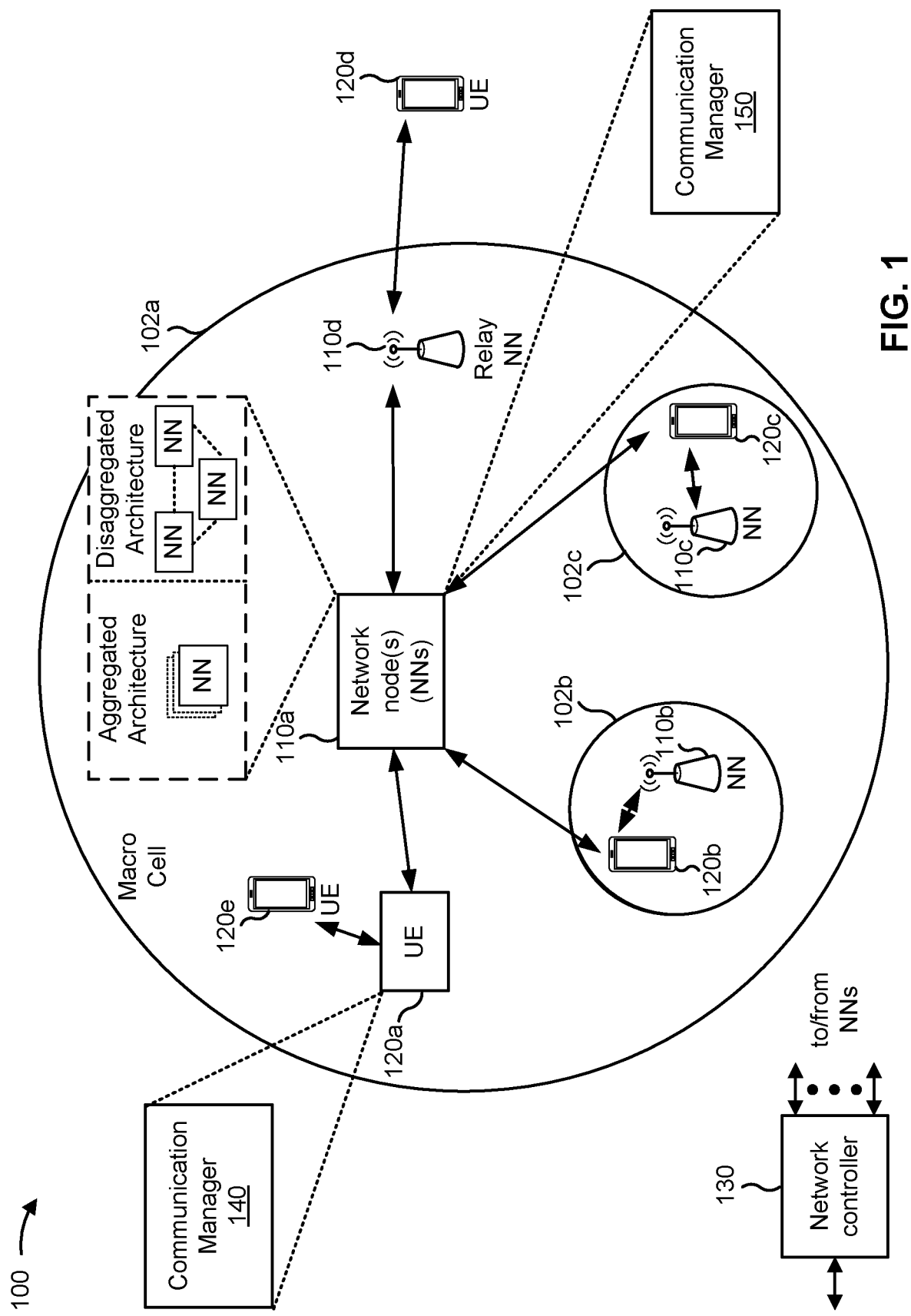
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (MC), or a Non-Real Time (Non-RT) MC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device (e.g., a non-terrestrial network node) may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which also may be referred to as a "node" or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a UE 120 may include a communication manager 140. As described in more detail elsewhere herein, the communication manager 140 may receive a configuration corresponding to a configured grant (CG), wherein the CG is associated with a CG transmission comprising a plurality of transport blocks (TBs); and receive a downlink control information (DCI) transmission comprising at least one state change indication corresponding to at least one state change associated with the CG transmission. Additionally, or alternatively, the communication manager 140 may perform one or more other operations described herein.

In some aspects, the network node 110 may include a communication manager 150. As described in more detail elsewhere herein, the communication manager 150 may transmit a configuration corresponding to a CG, wherein the CG is associated with a CG transmission comprising a plurality of TBs; and transmit a DCI transmission comprising at least one state change indication corresponding to at least one state change associated with the CG transmission. Additionally, or alternatively, the communication manager 150 may perform one or more other operations described herein.

As indicated above, FIG. 1 is provided as an example. Other examples may differ from what is described with regard to FIG. 1.

Figure 2:
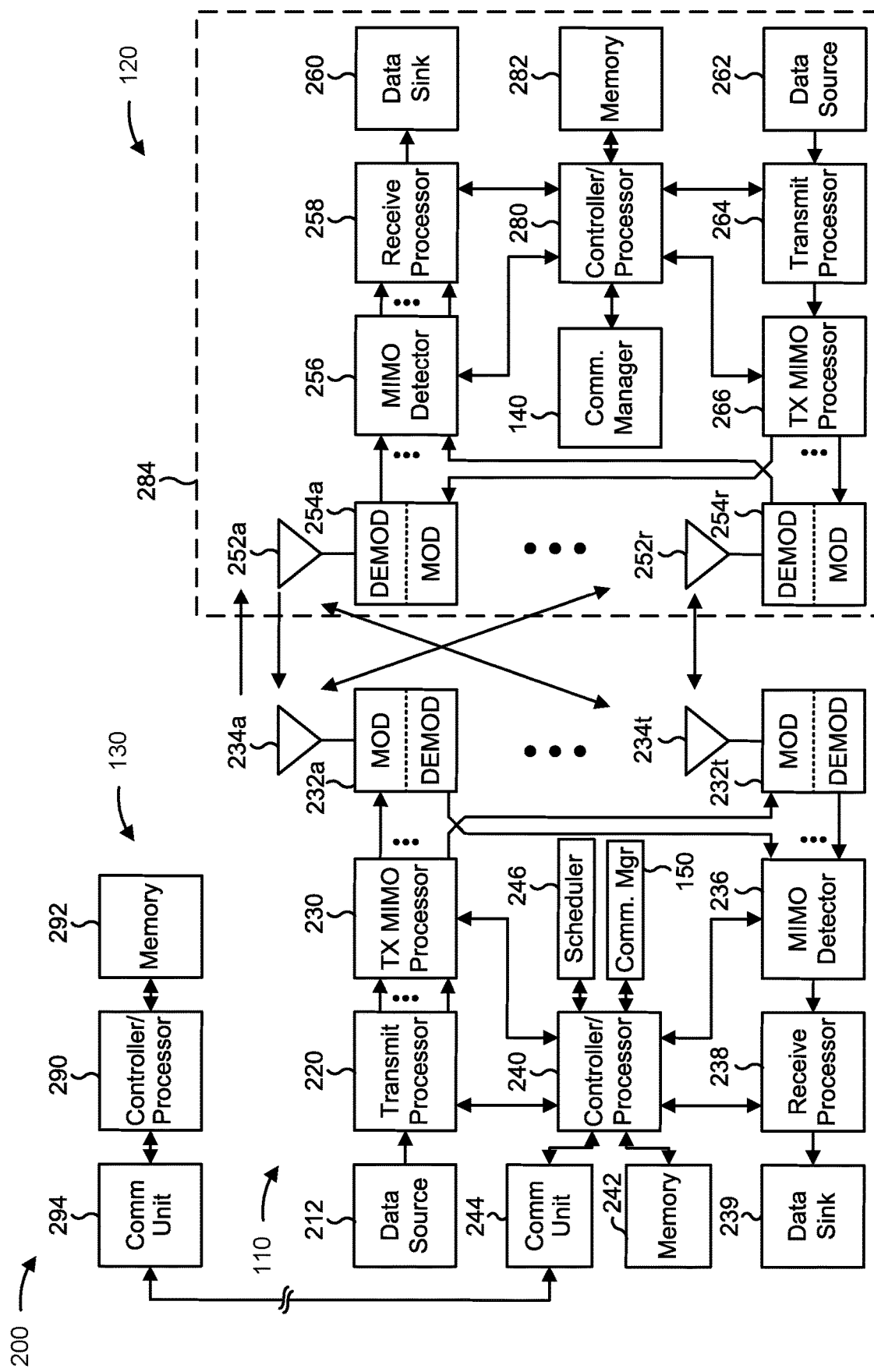
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a centralized unit (CU), a distributed unit (DU), a radio unit (RU), a Near-Real Time (Near-RT) RAN Intelligent Controller (RIC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions.

For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with state changes associated with a configured grant transmission of a plurality of transport blocks, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE includes means for receiving a configuration corresponding to a CG, wherein the CG is associated with a CG transmission comprising a plurality of TBs; and/or means for receiving a DCI transmission comprising at least one state change indication corresponding to at least one state change associated with the CG transmission. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a configuration corresponding to a CG, wherein the CG is associated with a CG transmission comprising a plurality of TBs; and/or means for transmitting a DCI transmission comprising at least one state change indication corresponding to at least one state change associated with the CG transmission. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
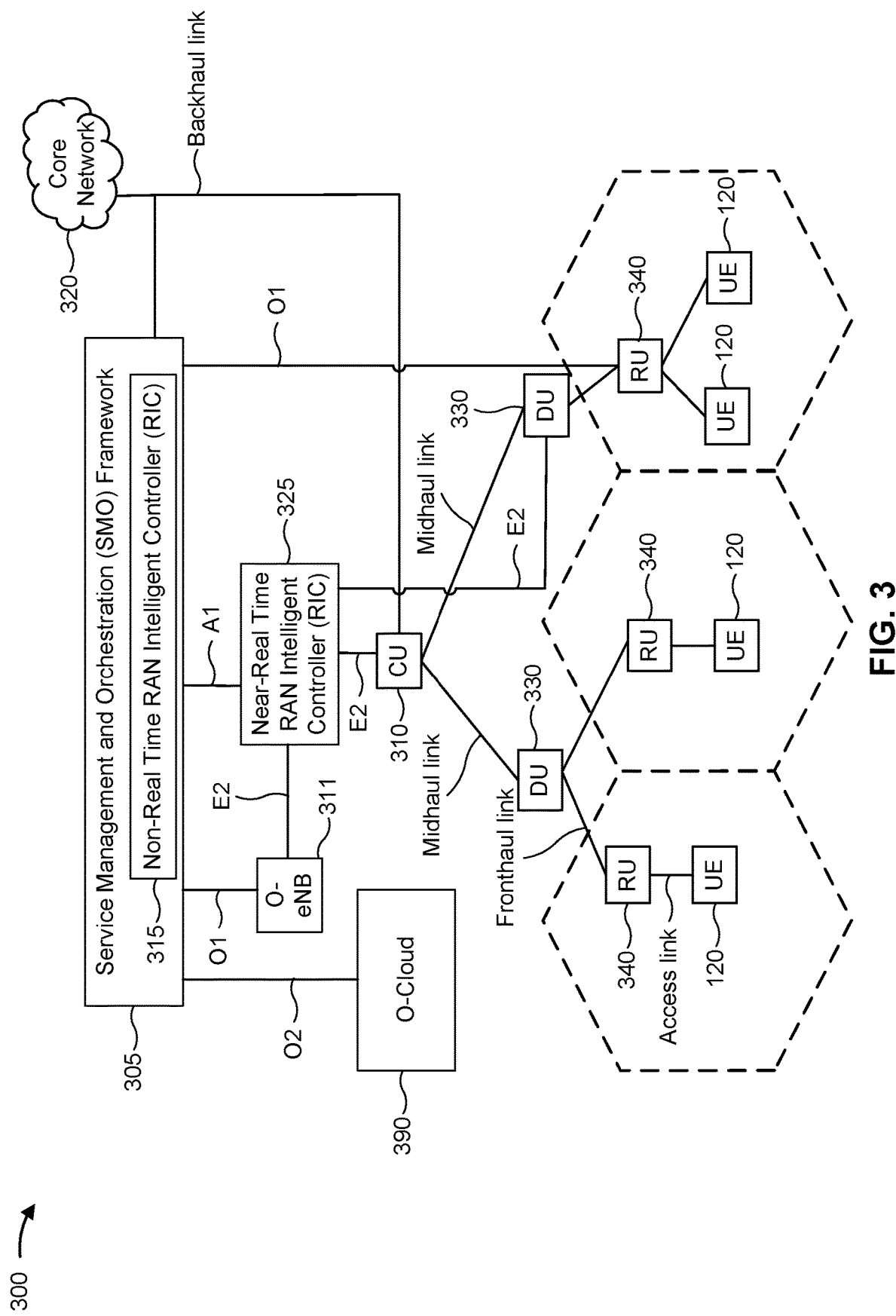
FIG. 3 is a diagram illustrating an example of open radio access network communications, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT MC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT MC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
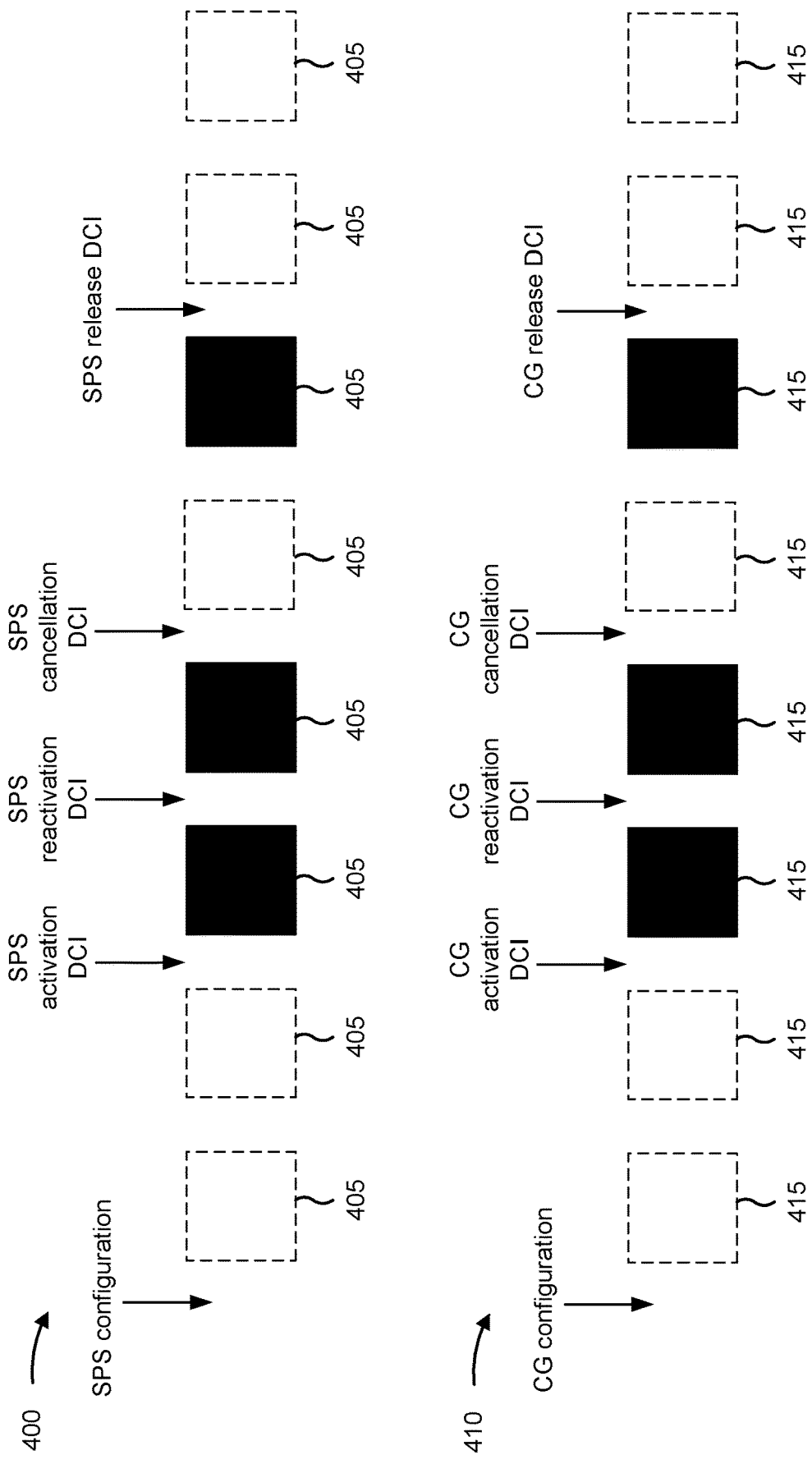
FIG. 4 is a diagram illustrating an example of downlink semi-persistent scheduling (SPS) communication and an example of uplink configured grant (CG) communication, in accordance with the present disclosure.

FIG. 4 is a diagram illustrating an example 400 of downlink semi-persistent scheduling (SPS) communication and an example 410 of uplink CG communication, in accordance with the present disclosure. SPS communications may include periodic downlink communications that are configured for a UE, such that the network node does not need to send separate DCI to schedule each downlink communication, thereby conserving signaling overhead. CG communications may include periodic uplink communications that are configured for a UE, such that the network node does not need to send separate DCI to schedule each uplink communication, thereby conserving signaling overhead.

As shown in example 400, a UE may be configured with an SPS configuration for SPS communications. For example, the UE may receive the SPS configuration via an RRC message transmitted by a network node. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 405 for the UE. The SPS configuration may also configure hybrid automatic repeat request (HARD)-acknowledgement (ACK) (HARQ-ACK) feedback resources for the UE to transmit HARQ-ACK feedback for SPS physical downlink shared channel (PDSCH) communications received in the SPS occasions 405. For example, the SPS configuration may indicate a PDSCH-to-HARQ feedback timing value, which may be referred to as a K1 value in a wireless communication standard (e.g., a 3GPP standard).

The network node may transmit SPS activation DCI to the UE to activate the SPS configuration for the UE. The network node may indicate, in the SPS activation DCI, communication parameters, such as an MCS, a resource block (RB) allocation, and/or antenna ports, for the SPS PDSCH communications to be transmitted in the scheduled SPS occasions 405. The UE may begin monitoring the SPS occasions 405 based at least in part on receiving the SPS activation DCI. For example, beginning with a next scheduled SPS occasion 405 subsequent to receiving the SPS activation DCI, the UE may monitor the scheduled SPS occasions 405 to decode PDSCH communications using the communication parameters indicated in the SPS activation DCI. The UE may refrain from monitoring configured SPS occasions 405 prior to receiving the SPS activation DCI.

The network node may transmit SPS reactivation DCI to the UE to change the communication parameters for the SPS PDSCH communications. Based at least in part on receiving the SPS reactivation DCI, the UE may begin monitoring the scheduled SPS occasions 405 using the communication parameters indicated in the SPS reactivation DCI. For example, beginning with a next scheduled SPS occasion 405 subsequent to receiving the SPS reactivation DCI, the UE may monitor the scheduled SPS occasions 405 to decode PDSCH communications based on the communication parameters indicated in the SPS reactivation DCI.

In some cases, such as when the network node does not have downlink traffic to transmit to the UE, the network node may transmit SPS cancellation DCI to the UE to temporarily cancel or deactivate one or more subsequent SPS occasions 405 for the UE. The SPS cancellation DCI may deactivate only a subsequent one SPS occasion 405 or a subsequent N SPS occasions 405 (where N is an integer). SPS occasions 405 after the one or more (e.g., N) SPS occasions 405 subsequent to the SPS cancellation DCI may remain activated. Based at least in part on receiving the SPS cancellation DCI, the UE may refrain from monitoring the one or more (e.g., N) SPS occasions 405 subsequent to receiving the SPS cancellation DCI. As shown in example 400, the SPS cancellation DCI cancels one subsequent SPS occasion 405 for the UE. After the SPS occasion 405 (or N SPS occasions) subsequent to receiving the SPS cancellation DCI, the UE may automatically resume monitoring the scheduled SPS occasions 405.

The network node may transmit SPS release DCI to the UE to deactivate the SPS configuration for the UE. The UE may stop monitoring the scheduled SPS occasions 405 based at least in part on receiving the SPS release DCI. For example, the UE may refrain from monitoring any scheduled SPS occasions 405 until another SPS activation DCI is received from the network node. Whereas the SPS cancellation DCI may deactivate only a subsequent one SPS occasion 405 or a subsequent N SPS occasions 405, the SPS release DCI deactivates all subsequent SPS occasions 405 for a given SPS configuration for the UE until the given SPS configuration is activated again by a new SPS activation DCI.

As shown in example 410, a UE may be configured with a CG configuration for CG communications. For example, the UE may receive the CG configuration via an RRC message transmitted by a network node. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 415 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network node may transmit CG activation DCI to the UE to activate the CG configuration for the UE. The network node may indicate, in the CG activation DCI, communication parameters, such as an MCS, an RB allocation, and/or antenna ports, for the CG physical uplink shared channel (PUSCH) communications to be transmitted in the scheduled CG occasions 415. The UE may begin transmitting in the CG occasions 415 based at least in part on receiving the CG activation DCI. For example, beginning with a next scheduled CG occasion 415 subsequent to receiving the CG activation DCI, the UE may transmit a PUSCH communication in the scheduled CG occasions 415 using the communication parameters indicated in the CG activation DCI. The UE may refrain from transmitting in configured CG occasions 415 prior to receiving the CG activation DCI.

The network node may transmit CG reactivation DCI to the UE to change the communication parameters for the CG PUSCH communications. Based at least in part on receiving the CG reactivation DCI, and the UE may begin transmitting in the scheduled CG occasions 415 using the communication parameters indicated in the CG reactivation DCI. For example, beginning with a next scheduled CG occasion 415 subsequent to receiving the CG reactivation DCI, the UE may transmit PUSCH communications in the scheduled CG occasions 415 based at least in part on the communication parameters indicated in the CG reactivation DCI.

In some cases, such as when the network node needs to override a scheduled CG communication for a higher priority communication, the network node may transmit CG cancellation DCI to the UE to temporarily cancel or deactivate one or more subsequent CG occasions 415 for the UE. The CG cancellation DCI may deactivate only a subsequent one CG occasion 415 or a subsequent N CG occasions 415 (where N is an integer). CG occasions 415 after the one or more (e.g., N) CG occasions 415 subsequent to the CG cancellation DCI may remain activated. Based at least in part on receiving the CG cancellation DCI, the UE may refrain from transmitting in the one or more (e.g., N) CG occasions 415 subsequent to receiving the CG cancellation DCI. As shown in example 410, the CG cancellation DCI cancels one subsequent CG occasion 415 for the UE. After the CG occasion 415 (or N CG occasions) subsequent to receiving the CG cancellation DCI, the UE may automatically resume transmission in the scheduled CG occasions 415.

The network node may transmit CG release DCI to the UE to deactivate the CG configuration for the UE. The UE may stop transmitting in the scheduled CG occasions 415 based at least in part on receiving the CG release DCI. For example, the UE may refrain from transmitting in any scheduled CG occasions 415 until another CG activation DCI is received from the network node. Whereas the CG cancellation DCI may deactivate only a subsequent one CG occasion 415 or a subsequent N CG occasions 415, the CG release DCI deactivates all subsequent CG occasions 415 for a given CG configuration for the UE until the given CG configuration is activated again by a new CG activation DCI.

In some cases, it can be beneficial for a UE and/or network node to transmit more than one TB (e.g., two TBs) on a PUSCH or a PDSCH, respectively. For example, by transmitting two TBs, uplink MIMO may be able to support more than four layers for PUSCH communication. Additionally, while the dynamic grant PDSCH can support two TBs, downlink SPS typically can support only one TB per SPS.

For downlink SPS and/or uplink CG, the same DCI format (e.g., DCI format 0_1/0_2 and 1_1/1_2) can be used to facilitate activation, release, and/or retransmission. For example, the same DCI format may activate a group and/or sequence of PUSCH and/or PDSCH transmissions, and provide the scheduling information, such as MCS, time-domain resource allocation (e.g., OFDM symbols), frequency-domain resource allocation (e.g., RBs), and/or spatial domain resource allocation (e.g., precoder, number of layers, DMRS ports). The DCI format also may release a CG or SPS configuration and/or indicate an uplink and/or downlink grant for retransmission of a failed uplink CG and/or SPS transmission.

For the UE to determine the purpose for which the DCI is scheduled, the UE can validate the DCI. For example, a valid DCI transmission can include a new data indicator (NDI) having a specified value (e.g., NDI=0), a redundancy version (RV) having a specified value or any value, and/or a HARQ identifier (ID) having a specified value (or any value). For example, activation can be validated where NDI=0, RV=all 0, HARQ ID=all 0 (in case only one SPS/ULCG is configured on the associated downlink/uplink serving cell), release can be validated where NDI=0, RV=all 0, HARQ ID=all 0 (in case only one SPS/ULCG is configured on the associated downlink/uplink serving cell), MCS=all 1, frequency domain resource allocation (FDRA) =all 0 or all 1, and retransmission can be validated where NDI=1. The HARQ ID can be used to indicate the PDSCH/PUSCH communication that needs to be retransmitted. In some cases, if validation is not achieved, the UE can discard all the information in the DCI format. Typically, the DCI formats do not support activation, release and retransmission indicators for multiple TB CG transmissions. Thus, only one TB can generally be transmitted at a time, reducing efficiency and thereby having a negative impact on network performance.

Some aspects of the techniques and apparatuses described herein provide support for activation, release, and retransmission of multiple TB CG communications. In some aspects, the techniques and apparatuses described herein may apply to access link communications and/or sidelink communications. A CG communication, for example, may include an uplink CG communication, a downlink SPS communication, a sidelink CG communication, or a sidelink SPS communication. In some aspects, for example, a UE may receive a configuration corresponding to a CG, where the CG is associated with a CG transmission comprising a plurality of TBs. The UE may further receive a DCI transmission that includes at least one state change indication corresponding to at least one state change associated with the CG transmission. In this way, some aspects may facilitate transmission of multiple TBs using a CG, thereby improving communication efficiency and positively impacting network performance.

As indicated above, FIG. 4 is provided as an example. Other examples may differ from what is described with respect to FIG. 4.

Figure 5:
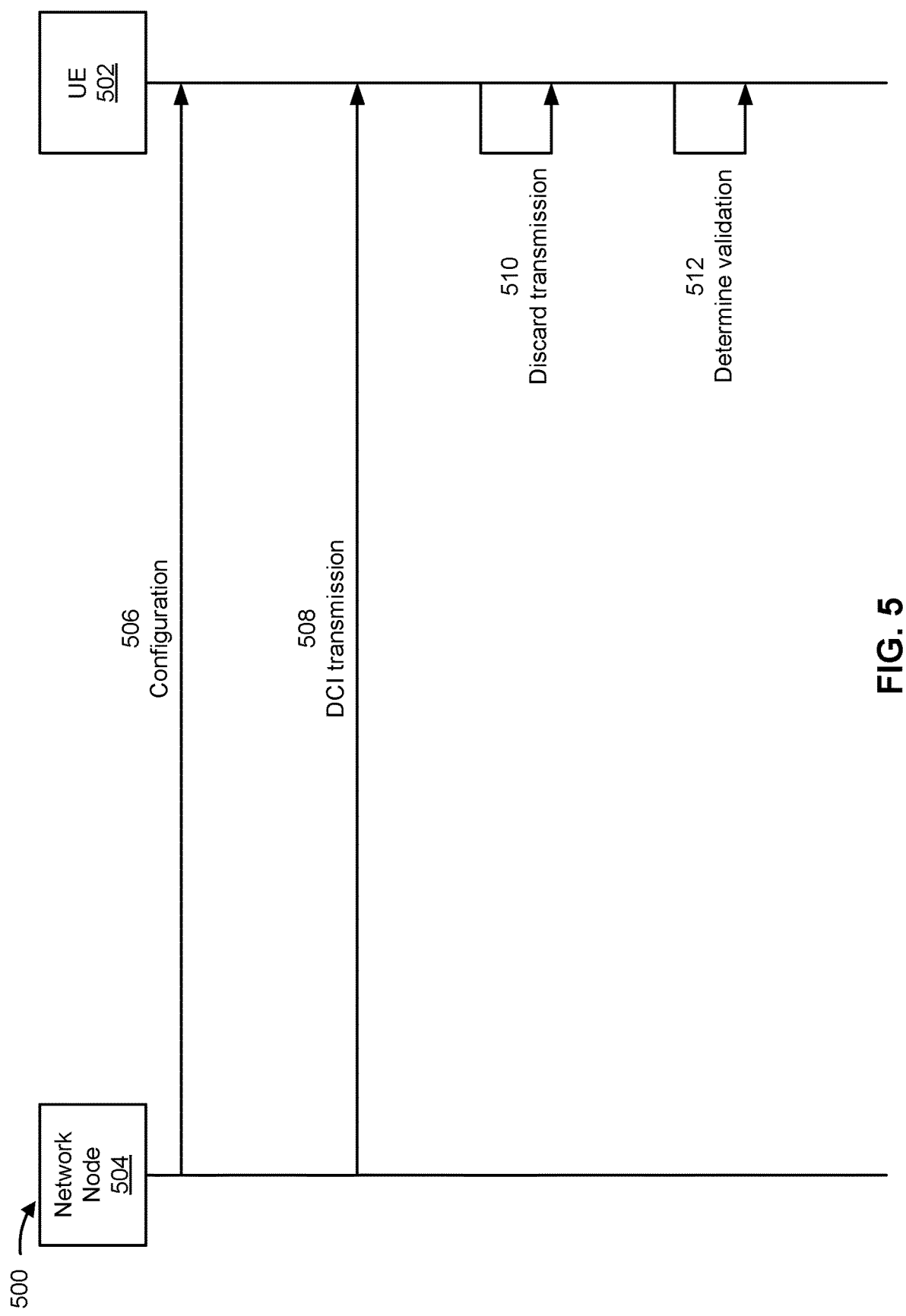
FIG. 5 is a diagram illustrating an example associated with state changes associated with a CG transmission of a plurality of transport blocks (TBs), in accordance with the present disclosure.

FIG. 5 is a diagram illustrating an example 500 associated with state changes associated with a CG transmission of a plurality of TBs, in accordance with the present disclosure. As shown in FIG. 5, a UE 502 and a network node 504 may communicate with one another. In some aspects, the network node 504 may include a network node, a relay device, a network function, and/or a UE, among other examples.

As shown by reference number 506, the network node 504 may transmit, and the UE 502 may receive, a configuration corresponding to a CG. The CG may be associated with a CG transmission comprising a plurality of TBs. In some aspects, the CG may include a downlink SPS grant. In some other aspects, the CG may include an uplink CG. In some other aspects, the CG may include a sidelink SPS grant. In some other aspects, the CG may include a sidelink CG.

As shown by reference number 508, the network node 504 may transmit, and the UE 502 may receive, a DCI transmission that includes at least one state change indication corresponding to at least one state change associated with the CG transmission. In some aspects, the at least one state change indication may include an indication of an activation associated with the CG transmission, a release associated with the CG transmission, or a retransmission associated with the CG transmission. In some aspects, the CG may be activated, released, and/or retransmitted per PDSCH or PUSCH. For example, a DCI transmission may include a state change indication that corresponds to all TBs associated with a PDSCH or PUSCH. In some other aspects, the state change indication may correspond to TBs. For example, in some aspects, a DCI transmission may serve one purpose (e.g., activation) for one TB and another purpose (e.g., release or retransmission) for another TB associated with a same PDSCH or PUSCH transmission.

In some aspects, the at least one state change may correspond to the plurality of TBs, and the at least one state change indication may include a first NDI value associated with a first TB of the plurality of TBs and a second NDI value associated with a second TB of the plurality of TBs. In some aspects, the at least one state change indication may indicate the state change associated with the CG transmission based at least in part on the first NDI value corresponding to the second NDI value. In some aspects, the at least one state change indication may fail to indicate the state change associated with the CG transmission based at least in part on the first NDI value being different than the second NDI value. In some aspects, the at least one state change indication may indicate the state change associated with the CG transmission based at least in part on the first NDI value being a specified value. In some aspects, the UE 502 may only use a first (or last) NDI value for validation, and ignore the other NDI(s). For example, in some aspects, only the first (or last) NDI value is used to indicate the purpose of the DCI (e.g., the type of state change caused by the DCI), and the other NDI(s) may be set to a fixed value, regardless of the purpose (e.g., type of state change caused by the DCI) of the DCI. Alternatively, the other NDI values may be reserved for other purposes (e.g., indicating signaling and/or information other than the state change type, among other examples).

In some aspects, the at least one state change may correspond to the plurality of TBs, and the at least one state change indication may include at least one of a first RV value associated with a first TB of the plurality of TBs and a second RV value associated with a second TB of the plurality of TBs. The at least one state change indication may indicate an activation associated with the CG transmission based at least in part on at least one of the first RV value or the second RV value comprising a specified value. In some aspects, the first TB of the plurality of TBs may be disabled based at least in part on a first pair of parameter values comprising a pair of specified values. For example, the first pair of parameter values may include the first RV value and a first MCS value associated with the first TB. The at least one state change indication may indicate a quantity of TBs of the plurality of TBs that are activated.

In some aspects, the at least one state change may correspond to the plurality of TBs, and the at least one state change indication may include at least one of a first pair of parameter values or a second pair of parameter values. The first pair of parameter values may include a first RV value associated with a first TB of the plurality of TBs and a first MCS value associated with the first TB, and the second pair of parameter values may include a second RV value associated with a second TB of the plurality of TBs and a second MCS value associated with a second TB. In some aspects, the at least one state change indication may indicate a release associated with the CG transmission based at least in part on the first RV value corresponding to the second RV value and the first MCS value corresponding to the second MCS value.

The at least one state change may correspond to the plurality of TBs, and the at least one state change indication may include a first pair of parameter values of a plurality of pairs of parameter values. The plurality of pairs of parameter values may further include a second pair of parameter values, where the first pair of parameter values includes a first RV value associated with a first TB of the plurality of TBs and a first MCS value associated with the first TB. The second pair of parameter values may include a second RV value associated with a second TB of the plurality of TBs and a second MCS value associated with a second TB. The at least one state change indication may indicate a release associated with the CG transmission based at least in part on at least one of the first RV value or the first MCS value comprising a specified value.

In one example, the UE 502 may only use a first pair (or a last pair) of an RV value and an MCS value for a release indication. Any other pair or pairs of RV values and MCS values may be ignored by the UE 502. In another example, the first pair (or the last pair) of an RV value and an MCS value may be used for release indication, and any other pairs may be set to a fixed value pair. In another example, the first pair (or the last pair) of an RV value and an MCS value may be used for release vindication, an any other pair of RV value and MCS value may be reserved. The reserved value may be used, for example, for indicating other information and/or signaling (e.g., other than the release indication).

As shown by reference number 510, the UE 502 may discard the DCI transmission based at least in part on the first pair of parameter values including at least one parameter value that is different from at least one parameter value of the second pair of parameter values. As shown by reference number 512, the UE 502 may determine a validation associated with the at least one state change indication based at least in part on at least one of the second RV value or the second MCS value comprising a validation value. In some aspects, for example, the first TB may be enabled and the second TB may be disabled. The UE 502 may determine a first validity of the first TB and a second validity of the second TB.

In some aspects, a maximum quantity of TBs in the plurality of TBs may be based at least in part on a radio resource control parameter corresponding to a dynamic grant. In some aspects, the at least one state change may correspond to the plurality of TBs, and the DCI transmission may indicate a same state change for each TB of the plurality of TBs. The DCI transmission may correspond to a first quantity of TBs of the plurality of TBs, and the network node 504 may transmit, and the UE 502 may receive, an additional DCI transmission that reactivates the CG based at least in part on updated scheduling information. The additional DCI transmission may correspond to a second quantity of TBs of the plurality of TBs, where the second quantity is different from the first quantity.

In some aspects, the at least one state change indication may include a first state change indication corresponding to a first TB of the plurality of TBs and a second state change indication corresponding to a second TB of the plurality of TBs. The first state change indication may indicate a first state change associated with the first TB and a second state change associated with the second TB, where the second state change is different from the first state change. In some aspects, the first state change indication may indicate the first state change based at least in part on at least one of a first NDI value associated with the first TB, a first RV value associated with the first TB, or a first MCS value associated with the first TB. The second state change indication may indicate the second state change based at least in part on at least one of a second NDI value associated with the second TB, a second RV value associated with the second TB, or a second MCS value associated with the second TB. The first state change may include a retransmission associated with the first TB. In some aspects, the first state change may include the retransmission based at least in part on a first NDI value associated with the first TB comprising a first specified value. In some aspects, the DCI transmission may include a HARQ ID comprising a HARQ process ID value that indicates a HARQ process corresponding to the retransmission. In some aspects, the second state change may include a continuation state.

In some aspects, the UE 502 may determine a configuration index associated with the second TB based at least in part on a last PDSCH associated with the HARQ process. The first state change may include the retransmission based at least in part on a first pair of parameters associated with the first TB comprising a valid combination of parameter values. The first pair of parameters comprises a first RV value associated with the first TB and a first MCS value associated with the first TB. In some aspects, the first state change may include the retransmission based at least in part on a first NDI value associated with the first TB comprising a first specified value, and the second state change comprises an activation or a release based at least in part on at least one of a second NDI value associated with the second TB comprising a second specified value or a second pair of parameters associated with the second TB comprising at least one specified parameter value. The second pair of parameters may include an RV value associated with the second TB and an MCS value associated with the second TB. The activation may include a reactivation of the second TB based at least in part on the second pair of parameters.

In some aspects, the first state may include an activation associated with the first TB and the second state change may include a release associated with the second TB. The first state change may include the activation based at least in part on a first NDI value associated with the first TB comprising a specified NDI value, and the second state change may include the release based at least in part on a second NDI value associated with the second TB comprising the specified value. In some aspects, the first state change may include the activation based at least in part on a first RV value associated with the first TB comprising a specified RV value and the second state change may include the release based at least in part on a second RV value. The second RV value may correspond to the first RV value. In some aspects, the first state change may include the activation based at least in part on a first MCS value associated with the first TB comprising an MCS value other than a specified MCS value, and the second state change comprises the release based at least in part on a second MCS value associated with the second TB comprising the specified MCS value. Scheduling information (e.g., the time domain resource allocation, the frequency domain resource allocation, the spatial domain information, DMRS ports, precoding configuration) included in the DCI transmission may be associated with only the first TB based at least in part on the second state change comprising the release.

In some aspects, a maximum quantity of TBs associated with a dynamic grant transmission corresponding to the dynamic grant may be no smaller than the maximum quantity of TBs in the plurality of TBs. A bitwidth of at least one field in a DCI format corresponding to the DCI transmission may be based at least in part on the dynamic grant. In some aspects, a maximum quantity of TBs associated with a dynamic grant transmission corresponding to the dynamic grant may be smaller than the maximum quantity of TBs in the plurality of TBs. A bitwidth of at least one field in a DCI format corresponding to the DCI transmission may be based at least in part on a maximum bitwidth associated with the dynamic grant and the CG.

In some aspects, a maximum quantity of TBs in the plurality of TBs may be based at least in part on an RRC parameter corresponding to one or more CGs configured in a cell, where the one or more CGs includes the CG. For example, the UE 502 may be configured with two separate parameters related to a maximum number of TBs per PUSCH and/or PDSCH. One parameter may be used to indicate the maximum number of TBs associated with DG PUSCH or DG PDSCH, and the other parameter may be associated with CG PUSCH (e.g., UL CG), CG PDSCH (e.g., DL SPS), or sidelink (SL) CG. In some aspects, a maximum quantity of TBs in the plurality of TBs may be based at least in part on an RRC parameter corresponding to the CG. For example, the maximum number of TBs per CG transmission may be separately configured for each CG configuration (e.g., DL SPS configuration, UL CG configuration, or SL CG configuration).

In some aspects, the CG may include a downlink SPS grant, and the UE 502 may transmit a HARQ-ACK transmission based at least in part on the CG transmission. In some aspects, a quantity of bits associated with the CG, and included in the HARQ-ACK transmission may be based at least in part on a quantity of TBs activated in a control channel corresponding to the CG. In some aspects, a quantity of bits associated with the CG, and included in the HARQ-ACK transmission, may be based at least in part on a maximum quantity of TBs configured for the CG. The maximum quantity of TBs configured for the CG may be, for example, two TBs, and the HARQ-ACK transmission may include two bits.

In some aspects, the UE 502 may switch to a single-TB configuration corresponding to the CG based at least in part on an amount of data to be communicated using the CG. In some aspects, the UE 502 may determine whether to transmit the available data on resources associated with the first TB or the second TB (e.g., the first TB may be scheduled on a first number of spatial layers, and the second TB maybe scheduled on a second number of spatial layers). In some aspects, the determination of which TB to use for the CG transmission (from the more than one scheduled TBs) may depends on the priority of the first TB and the second TB. In some aspects, a first TB of the plurality of TBs may have a first priority that is higher than a second priority associated with a second TB based at least in part on switching to the single-TB configuration. In some aspects, priority may be determined based on the TB index. For example, the first priority may be higher than the second priority based at least in part on a TB index associated with the first TB being lower than the TB index associated with the second TB. In some aspects, priority may be determined based on MCS value. For example, the first priority may be higher than the second priority based at least in prat on an MCS value associated with the first TB being higher (or lower) than an MCS value associated with the second TB. In some aspects, priority may be determined based on a quantity of layers. For example, in some aspects, the first priority may be higher than the second priority based at least in part on a quantity of layers associated with the first TB being greater than (or less than) a quantity of layers associated with the second TB.

In some aspects, the UE 502 may receive a configuration that includes a dedicated parameter (e.g., an RRC parameter, or a MAC-CE parameter) that indicates that the UE 502 can switch to the single-TB configuration. For the DL SPS, the dedicated parameter may indicate that the network node 504 could switch the transmission to single-TB transmission depending on the data availability. In this case, the UE 502 may perform blind detection to detect the quantity of TBs that are actually transmitted by the network node 504. For UL CG, the roles of the network node 504 and the UE 502 are reversed. For example, the dedicated parameter may indicate whether the UE 502 is allowed to dynamically switch to single-TB transmission based on the data availability. If this is indeed allowed, the network node 504 may perform blind detection to determine a quantity of TBs that are transmitted by the UE 502 in each CG transmission occasion. On the other hand, if the parameter indicates that the UE 502 cannot dynamically switch back to single-TB transmission, the UE 502 may zero-pad the second TB. For example, the UE 502 may generate a number of padding bits and send the padding bits on the second TB (instead of skipping the transmission of the second TB).

In one example, the dedicated parameter may also be used to indicate whether the UE 502 can skip the entire transmission (e.g., where neither TB is transmitted) if no data is generated at the UE 502. In other words, if the parameter indicates that the UE 502 is allowed to skip a TB, the indication also may indicate that the UE 502 may be able to skip both TBs, and hence the network node 504 may determine among three hypotheses: no TB is transmitted, one TB is transmitted, and two TBs are transmitted. In another example, a separate RRC parameter may be used to indicate whether the UE 502 is allowed to skip both TBs. In that case, a number of scenarios may arise. In some aspects, the UE 502 may be allowed to skip 1 TB, but not both. In some other aspects, the UE 502 may be allowed to skip both 1 TB, and both TBs. In some aspects, the UE 502 may be allowed to skip all TBs (and hence the entire CG transmission), but it is not allowed to partially skip the TB. In some other aspects, the UE 502 may not be allowed to skip any TBs.

The UE 502 may perform, based at least in part on switching to the single-TB configuration, blind decoding on an additional CG transmission to determine a quantity of TBs transmitted. In some aspects, the UE 502 may transmit a HARQ-ACK transmission based at least in part on the CG transmission, where the HARQ-ACK transmission includes two bits regardless of whether the network node 504 has switched to single-TB transmission.

As indicated above, FIG. 5 is provided as an example. Other examples may differ from what is described with respect to FIG. 5.

Figure 6:
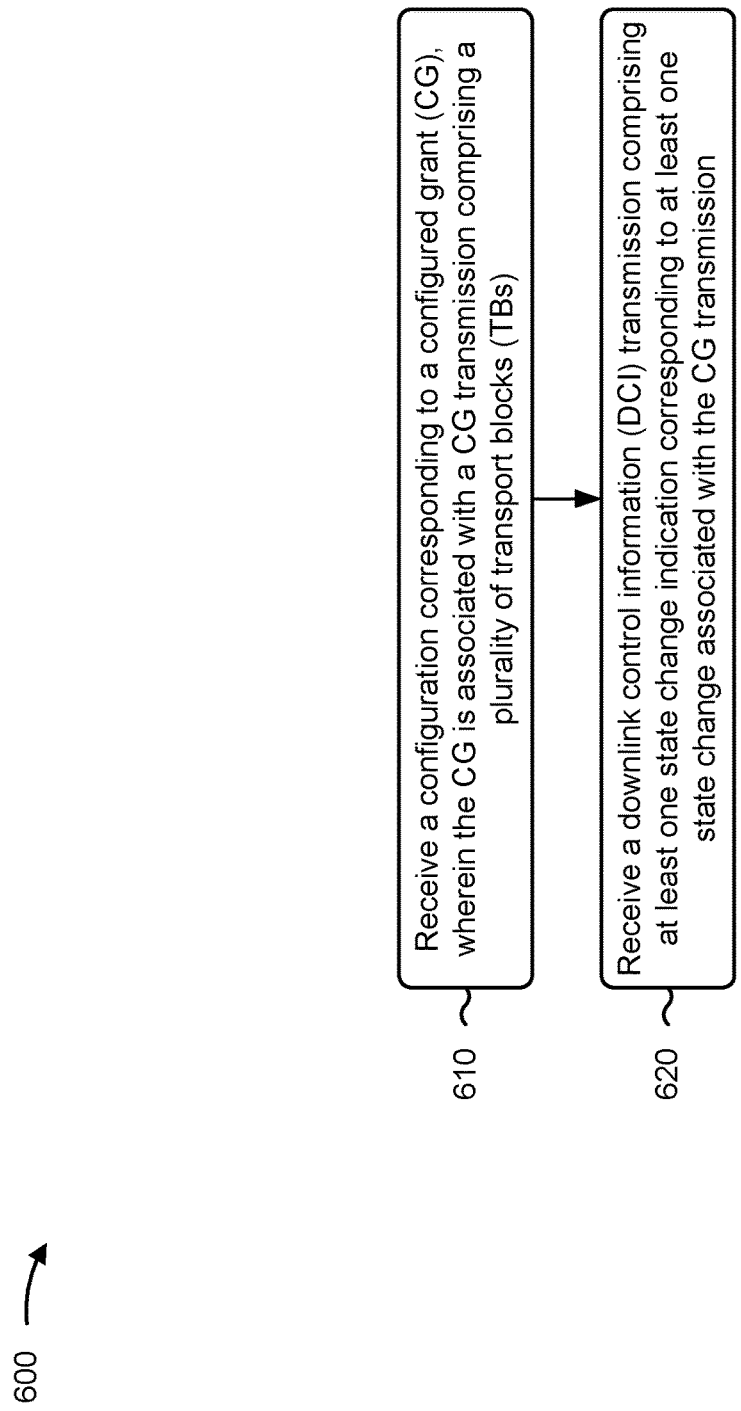
FIGS. 6 and 7 are diagrams illustrating example processes associated with state changes associated with a CG transmission of a plurality of TBs, in accordance with the present disclosure.

FIG. 6 is a diagram illustrating an example process 600 performed, for example, by a UE, in accordance with the present disclosure. Example process 600 is an example where the UE (e.g., UE 120) performs operations associated with state changes associated with a CG transmission of a plurality of TBs.

As shown in FIG. 6, in some aspects, process 600 may include receiving a configuration corresponding to a CG, wherein the CG is associated with a CG transmission comprising a plurality of TBs (block 610). For example, the UE (e.g., using communication manager 808 and/or reception component 802, depicted in FIG. 8) may receive a configuration corresponding to a CG, wherein the CG is associated with a CG transmission comprising a plurality of TBs, as described above.

As further shown in FIG. 6, in some aspects, process 600 may include receiving a DCI transmission comprising at least one state change indication corresponding to at least one state change associated with the CG transmission (block 620). For example, the UE (e.g., using communication manager 808 and/or reception component 802, depicted in FIG. 8) may receive a DCI transmission comprising at least one state change indication corresponding to at least one state change associated with the CG transmission, as described above.

Process 600 may include additional aspects, such as any single aspect or any combination of aspects described below and/or in connection with one or more other processes described elsewhere herein.

In a first aspect, the CG comprises a downlink SPS grant. In a second aspect, alone or in combination with the first aspect, the CG comprises an uplink CG. In a third aspect, alone or in combination with one or more of the first and second aspects, the at least one state change indication comprises an indication of an activation associated with the CG transmission, a release associated with the CG transmission, or a retransmission associated with the CG transmission.

In a fourth aspect, alone or in combination with one or more of the first through third aspects, the DCI transmission comprises a first NDI associated with a first TB of the plurality of TBs and a second NDI associated with a second TB of the plurality of TBs. In a fifth aspect, alone or in combination with one or more of the first through fourth aspects, the at least one state change corresponds to the plurality of TBs, and the at least one state change indication comprises a first NDI value associated with a first TB of the plurality of TBs and a second NDI value associated with a second TB of the plurality of TBs.

In a sixth aspect, alone or in combination with one or more of the first through fifth aspects, the at least one state change indication indicates the state change associated with the CG transmission based at least in part on the first NDI value corresponding to the second NDI value. In a seventh aspect, alone or in combination with one or more of the first through sixth aspects, the at least one state change indication fails to indicate the state change associated with the CG transmission based at least in part on the first NDI value being different than the second NDI value. In an eighth aspect, alone or in combination with one or more of the first through seventh aspects, the at least one state change indication indicates the state change associated with the CG transmission based at least in part on the first NDI value comprising a specified value.

In a ninth aspect, alone or in combination with one or more of the first through eighth aspects, the at least one state change corresponds to the plurality of TBs, and the at least one state change indication comprises at least one of a first RV value associated with a first TB of the plurality of TBs and a second RV value associated with a second TB of the plurality of TBs. In a tenth aspect, alone or in combination with one or more of the first through ninth aspects, the at least one state change indication indicates an activation associated with the CG transmission based at least in part on at least one of the first RV value or the second RV value comprising a specified value. In an eleventh aspect, alone or in combination with one or more of the first through tenth aspects, the first TB of the plurality of TBs is disabled based at least in part on a first pair of parameter values comprising a pair of specified values, wherein the first pair of parameter values comprises the first RV value and a first modulation and coding scheme value associated with the first TB.

In a twelfth aspect, alone or in combination with one or more of the first through eleventh aspects, the at least one state change indication indicates a quantity of TBs of the plurality of TBs that are activated. In a thirteenth aspect, alone or in combination with one or more of the first through twelfth aspects, the at least one state change corresponds to the plurality of TBs, and the at least one state change indication comprises at least one of a first pair of parameter values or a second pair of parameter values, the first pair of parameter values comprising a first RV value associated with a first TB of the plurality of TBs and a first MCS value associated with the first TB, and the second pair of parameter values comprising a second RV value associated with a second TB of the plurality of TBs and a second MCS value associated with a second TB.

In a fourteenth aspect, alone or in combination with one or more of the first through thirteenth aspects, the at least one state change indication indicates a release associated with the CG transmission based at least in part on the first RV value corresponding to the second RV value and the first MCS value corresponding to the second MCS value. In a fifteenth aspect, alone or in combination with one or more of the first through fourteenth aspects, process 600 includes discarding the DCI transmission based at least in part on the first pair of parameter values including at least one parameter value that is different from at least one parameter value of the second pair of parameter values. In a sixteenth aspect, alone or in combination with one or more of the first through fifteenth aspects, the at least one state change indication indicates a quantity of TBs of the plurality of TBs that are to be retransmitted.

In a seventeenth aspect, alone or in combination with one or more of the first through sixteenth aspects, the at least one state change corresponds to the plurality of TBs, wherein the at least one state change indication comprises a first pair of parameter values of a plurality of pairs of parameter values, the plurality of pairs of parameter values further comprising a second pair of parameter values, wherein the first pair of parameter values comprises a first RV value associated with a first TB of the plurality of TBs and a first MCS value associated with the first TB, and wherein the second pair of parameter values comprises a second RV value associated with a second TB of the plurality of TBs and a second MCS value associated with a second TB.

In an eighteenth aspect, alone or in combination with one or more of the first through seventeenth aspects, the at least one state change indication indicates a release associated with the CG transmission based at least in part on at least one of the first RV value or the first MCS value comprising a specified value. In a nineteenth aspect, alone or in combination with one or more of the first through eighteenth aspects, process 600 includes determining a validation associated with the at least one state change indication based at least in part on at least one of the second RV value or the second MCS value comprising a validation value.

In a twentieth aspect, alone or in combination with one or more of the first through nineteenth aspects, the first TB is enabled and the second TB is disabled. In a twenty-first aspect, alone or in combination with one or more of the first through twentieth aspects, the at least one state change corresponds to the plurality of TBs, and the DCI transmission indicates a same state change for each TB of the plurality of TBs. In a twenty-second aspect, alone or in combination with one or more of the first through twenty-first aspects, the DCI transmission corresponds to a first quantity of TBs of the plurality of TBs, and process 600 includes receiving an additional DCI transmission that reactivates the CG based at least in part on updated scheduling information, wherein the additional DCI transmission corresponds to a second quantity of TBs of the plurality of TBs, and wherein the second quantity is different from the first quantity.

In a twenty-third aspect, alone or in combination with one or more of the first through twenty-second aspects, the at least one state change indication comprises a first state change indication corresponding to a first TB of the plurality of TBs and a second state change indication corresponding to a second TB of the plurality of TBs. In a twenty-fourth aspect, alone or in combination with one or more of the first through twenty-third aspects, the first state change indication indicates a first state change associated with the first TB and a second state change associated with the second TB, wherein the second state change is different from the first state change. In a twenty-fifth aspect, alone or in combination with one or more of the first through twenty-fourth aspects, the first state change indication indicates the first state change based at least in part on at least one of a first NDI value associated with the first TB, a first RV value associated with the first TB, or a first MCS value associated with the first TB, and the second state change indication indicates the second state change based at least in part on at least one of a second NDI value associated with the second TB, a second RV value associated with the second TB, or a second MCS value associated with the second TB.

In a twenty-sixth aspect, alone or in combination with one or more of the first through twenty-fifth aspects, the first state change comprises a retransmission associated with the first TB. In a twenty-seventh aspect, alone or in combination with one or more of the first through twenty-sixth aspects, the first state change comprises the retransmission based at least in part on a first NDI value associated with the first TB comprising a first specified value. In a twenty-eighth aspect, alone or in combination with one or more of the first through twenty-seventh aspects, the DCI transmission comprises a HARQ ID comprising a HARQ process ID value that indicates a HARQ process corresponding to the retransmission.

In a twenty-ninth aspect, alone or in combination with one or more of the first through twenty-eighth aspects, process 600 includes determining a configuration index associated with the second TB based at least in part on a last physical downlink shared channel associated with the HARQ process. In a thirtieth aspect, alone or in combination with one or more of the first through twenty-ninth aspects, the first state change comprises the retransmission based at least in part on a first pair of parameters associated with the first TB comprising a valid combination of parameter values. In a thirty-first aspect, alone or in combination with one or more of the first through thirtieth aspects, the first pair of parameters comprises a first RV value associated with the first TB and a first MCS value associated with the first TB.

In a thirty-second aspect, alone or in combination with one or more of the first through thirty-first aspects, the first state change comprises the retransmission based at least in part on a first NDI value associated with the first TB comprising a first specified value, and the second state change comprises an activation or a release based at least in part on at least one of a second NDI value associated with the second TB comprising a second specified value or a second pair of parameters associated with the second TB comprising at least one specified parameter value. In a thirty-third aspect, alone or in combination with one or more of the first through thirty-second aspects, the second pair of parameters comprises a RV value associated with the second TB and a MCS value associated with the second TB. In a thirty-fourth aspect, alone or in combination with one or more of the first through thirty-third aspects, the activation comprises a reactivation of the second TB based at least in part on the second pair of parameters.

In a thirty-fifth aspect, alone or in combination with one or more of the first through thirty-fourth aspects, the first state change comprises an activation associated with the first TB and the second state change comprises a release associated with the second TB. In a thirty-sixth aspect, alone or in combination with one or more of the first through thirty-fifth aspects, the first state change comprises the activation based at least in part on a first NDI value associated with the first TB comprising a specified NDI value, and the second state change comprises the release based at least in part on a second NDI value associated with the second TB comprising the specified value. In a thirty-seventh aspect, alone or in combination with one or more of the first through thirty-sixth aspects, the first state change comprises the activation based at least in part on a first RV value associated with the first TB comprising a specified RV value and the second state change comprises the release based at least in part on a second RV value, wherein the second RV value corresponds to the first RV value. In a thirty-eighth aspect, alone or in combination with one or more of the first through thirty-seventh aspects, the first state change comprises the activation based at least in part on a first MCS value associated with the first TB comprising an MCS value other than a specified MCS value, and the second state change comprises the release based at least in part on a second MCS value associated with the second TB comprising the specified MCS value.

In a thirty-ninth aspect, alone or in combination with one or more of the first through thirty-eighth aspects, scheduling information included in the DCI transmission is associated with only the first TB based at least in part on the second state change comprising the release. In a fortieth aspect, alone or in combination with one or more of the first through thirty-ninth aspects, process 600 includes determining a first validity of the first TB and determining a second validity of the second TB. In a forty-first aspect, alone or in combination with one or more of the first through fortieth aspects, the second state change comprises a continuation state.

In a forty-second aspect, alone or in combination with one or more of the first through forty-first aspects, a maximum quantity of TBs in the plurality of TBs is based at least in part on a radio resource control parameter corresponding to a dynamic grant. In a forty-third aspect, alone or in combination with one or more of the first through forty-second aspects, a maximum quantity of TBs associated with a dynamic grant transmission corresponding to the dynamic grant is no smaller than the maximum quantity of TBs in the plurality of TBs. In a forty-fourth aspect, alone or in combination with one or more of the first through forty-third aspects, a bitwidth of at least one field in a DCI format corresponding to the DCI transmission is based at least in part on the dynamic grant. In a forty-fifth aspect, alone or in combination with one or more of the first through forty-fourth aspects, a maximum quantity of TBs associated with a dynamic grant transmission corresponding to the dynamic grant is smaller than the maximum quantity of TBs in the plurality of TBs. In a forty-sixth aspect, alone or in combination with one or more of the first through forty-fifth aspects, a bitwidth of at least one field in a DCI format corresponding to the DCI transmission is based at least in part on a maximum bitwidth associated with the dynamic grant and the CG.

In a forty-seventh aspect, alone or in combination with one or more of the first through forty-sixth aspects, a maximum quantity of TBs in the plurality of TBs is based at least in part on a radio resource control parameter corresponding to one or more CGs configured in a cell, wherein the one or more CGs includes the CG. In a forty-eighth aspect, alone or in combination with one or more of the first through forty-seventh aspects, a maximum quantity of TBs in the plurality of TBs is based at least in part on a radio resource control parameter corresponding to the CG. In a forty-ninth aspect, alone or in combination with one or more of the first through forty-eighth aspects, the CG comprises a downlink SPS grant, and process 600 includes transmitting a HARQ-ACK transmission based at least in part on the CG transmission. In a fiftieth aspect, alone or in combination with one or more of the first through forty-ninth aspects, a quantity of bits associated with the CG and included in the HARQ-ACK transmission is based at least in part on a quantity of TBs activated in a control channel corresponding to the CG. In a fifty-first aspect, alone or in combination with one or more of the first through fiftieth aspects, a quantity of bits associated with the HARQ-ACK transmission is based at least in part on a maximum quantity of TBs configured for the CG. In a fifty-second aspect, alone or in combination with one or more of the first through fifty-first aspects, the maximum quantity of TBs configured for the CG is two TBs, and the HARQ-ACK transmission includes two bits.

In a fifty-third aspect, alone or in combination with one or more of the first through fifty-second aspects, process 600 includes switching to a single-TB configuration corresponding to the CG based at least in part on an amount of data to be communicated using the CG. In a fifty-fourth aspect, alone or in combination with one or more of the first through fifty-third aspects, a first TB of the plurality of TBs has a first priority that is higher than a second priority associated with a second TB based at least in part on switching to the single-TB configuration. In a fifty-fifth aspect, alone or in combination with one or more of the first through fifty-fourth aspects, the first priority is higher than the second priority based at least in part on a TB index value associated with the first TB being lower than a TB index value associated with the second TB. In a fifty-sixth aspect, alone or in combination with one or more of the first through fifty-fifth aspects, the first priority is higher than the second priority based at least in part on an MCS value associated with the first TB being higher than an MCS value associated with the second TB. In a fifty-seventh aspect, alone or in combination with one or more of the first through fifty-sixth aspects, the first priority is higher than the second priority based at least in part on a quantity of layers associated with the first TB being greater than a quantity of layers associated with the second TB.

In a fifty-eighth aspect, alone or in combination with one or more of the first through fifty-seventh aspects, process 600 includes receiving a configuration comprising a dedicated parameter that indicates that the UE can switch to the single-TB configuration. In a fifty-ninth aspect, alone or in combination with one or more of the first through fifty-eighth aspects, process 600 includes performing, based at least in part on switching to the single-TB configuration, blind decoding on an additional CG transmission to determine a quantity of TBs transmitted. In a sixtieth aspect, alone or in combination with one or more of the first through fifty-ninth aspects, process 600 includes transmitting a HARQ-ACK transmission based at least in part on the CG transmission, wherein the HARQ-ACK transmission includes two bits based at least in part on switching to the single-TB configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
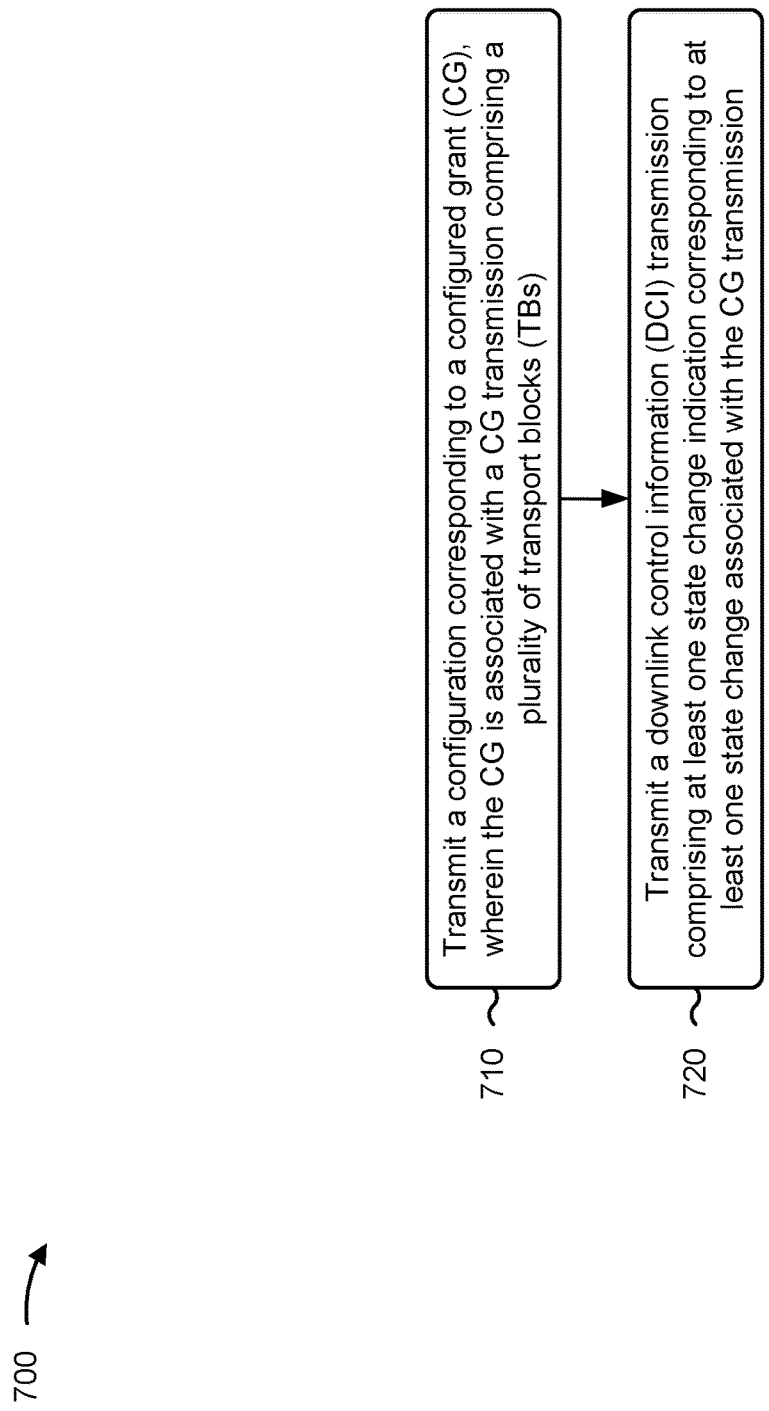

FIG. 7 is a diagram illustrating an example process 700 performed, for example, by a network node, in accordance with the present disclosure. Example process 700 is an example where the network node (e.g., network node 110) performs operations associated with state changes associated with a CG transmission of a plurality of TBs.

As shown in FIG. 7, in some aspects, process 700 may include transmitting a configuration corresponding to a CG, wherein the CG is associated with a CG transmission comprising a plurality of TBs (block 710). For example, the network node (e.g., using communication manager 908 and/or transmission component 904, depicted in FIG. 9) may transmit a configuration corresponding to a CG, wherein the CG is associated with a CG transmission comprising a plurality of TBs, as described above.

As further shown in FIG. 7, in some aspects, process 700 may include transmitting a DCI transmission comprising at least one state change indication corresponding to at least one state change associated with the CG transmission (block 720). For example, the network node (e.g., using communication manager 908 and/or transmission component 904, depicted in FIG. 9) may transmit a DCI transmission comprising at least one state change indication corresponding to at least one state change associated with the CG transmission, as described above.

Process 700 may include additional aspects, such as any single aspect or any combination of aspects described below and/or in connection with one or more other processes described elsewhere herein.

In a first aspect, the CG comprises a downlink SPS grant. In a second aspect, alone or in combination with the first aspect, the CG comprises an uplink CG. In a third aspect, alone or in combination with one or more of the first and second aspects, the at least one state change indication comprises an indication of an activation associated with the CG transmission, a release associated with the CG transmission, or a retransmission associated with the CG transmission. In a fourth aspect, alone or in combination with one or more of the first through third aspects, the DCI transmission comprises a first NDI associated with a first TB of the plurality of TBs and a second NDI associated with a second TB of the plurality of TBs. In a fifth aspect, alone or in combination with one or more of the first through fourth aspects, the at least one state change corresponds to the plurality of TBs, and the at least one state change indication comprises a first NDI value associated with a first TB of the plurality of TBs and a second NDI value associated with a second TB of the plurality of TBs.

In a sixth aspect, alone or in combination with one or more of the first through fifth aspects, the at least one state change indication indicates the state change associated with the CG transmission based at least in part on the first NDI value corresponding to the second NDI value. In a seventh aspect, alone or in combination with one or more of the first through sixth aspects, the at least one state change indication fails to indicate the state change associated with the CG transmission based at least in part on the first NDI value being different than the second NDI value. In an eighth aspect, alone or in combination with one or more of the first through seventh aspects, the at least one state change indication indicates the state change associated with the CG transmission based at least in part on the first NDI value comprising a specified value.

In a ninth aspect, alone or in combination with one or more of the first through eighth aspects, the at least one state change corresponds to the plurality of TBs, and the at least one state change indication comprises at least one of a first RV value associated with a first TB of the plurality of TBs and a second RV value associated with a second TB of the plurality of TBs. In a tenth aspect, alone or in combination with one or more of the first through ninth aspects, the at least one state change indication indicates an activation associated with the CG transmission based at least in part on at least one of the first RV value or the second RV value comprising a specified value. In an eleventh aspect, alone or in combination with one or more of the first through tenth aspects, the first TB of the plurality of TBs is disabled based at least in part on a first pair of parameter values comprising a pair of specified values, wherein the first pair of parameter values comprises the first RV value and a first modulation and coding scheme value associated with the first TB. In a twelfth aspect, alone or in combination with one or more of the first through eleventh aspects, the at least one state change indication indicates a quantity of TBs of the plurality of TBs that are activated.

In a thirteenth aspect, alone or in combination with one or more of the first through twelfth aspects, the at least one state change corresponds to the plurality of TBs, and the at least one state change indication comprises at least one of a first pair of parameter values or a second pair of parameter values, the first pair of parameter values comprising a first RV value associated with a first TB of the plurality of TBs and a first MCS value associated with the first TB, and the second pair of parameter values comprising a second RV value associated with a second TB of the plurality of TBs and a second MCS value associated with a second TB. In a fourteenth aspect, alone or in combination with one or more of the first through thirteenth aspects, the at least one state change indication indicates a release associated with the CG transmission based at least in part on the first RV value corresponding to the second RV value and the first MCS value corresponding to the second MCS value. In a fifteenth aspect, alone or in combination with one or more of the first through fourteenth aspects, the at least one state change indication indicates a quantity of TBs of the plurality of TBs that are to be retransmitted.

In a sixteenth aspect, alone or in combination with one or more of the first through fifteenth aspects, the at least one state change corresponds to the plurality of TBs, wherein the at least one state change indication comprises a first pair of parameter values of a plurality of pairs of parameter values, the plurality of pairs of parameter values further comprising a second pair of parameter values, wherein the first pair of parameter values comprises a first RV value associated with a first TB of the plurality of TBs and a first MCS value associated with the first TB, and wherein the second pair of parameter values comprises a second RV value associated with a second TB of the plurality of TBs and a second MCS value associated with a second TB. In a seventeenth aspect, alone or in combination with one or more of the first through sixteenth aspects, the at least one state change indication indicates a release associated with the CG transmission based at least in part on at least one of the first RV value or the first MCS value comprising a specified value. In an eighteenth aspect, alone or in combination with one or more of the first through seventeenth aspects, the first TB is enabled and the second TB is disabled.

In a nineteenth aspect, alone or in combination with one or more of the first through eighteenth aspects, the at least one state change corresponds to the plurality of TBs, and the DCI transmission indicates a same state change for each TB of the plurality of TBs. In a twentieth aspect, alone or in combination with one or more of the first through nineteenth aspects, the DCI transmission corresponds to a first quantity of TBs of the plurality of TBs, the method further comprising transmitting an additional DCI transmission that reactivates the CG based at least in part on updated scheduling information, wherein the additional DCI transmission corresponds to a second quantity of TBs of the plurality of TBs, and wherein the second quantity is different from the first quantity. In a twenty-first aspect, alone or in combination with one or more of the first through twentieth aspects, the at least one state change indication comprises a first state change indication corresponding to a first TB of the plurality of TBs and a second state change indication corresponding to a second TB of the plurality of TBs.

In a twenty-second aspect, alone or in combination with one or more of the first through twenty-first aspects, the first state change indication indicates a first state change associated with the first TB and a second state change associated with the second TB, wherein the second state change is different from the first state change. In a twenty-third aspect, alone or in combination with one or more of the first through twenty-second aspects, the first state change indication indicates the first state change based at least in part on at least one of a first NDI value associated with the first TB, a first RV value associated with the first TB, or a first MCS value associated with the first TB, and the second state change indication indicates the second state change based at least in part on at least one of a second NDI value associated with the second TB, a second RV value associated with the second TB, or a second MCS value associated with the second TB. In a twenty-fourth aspect, alone or in combination with one or more of the first through twenty-third aspects, the first state change comprises a retransmission associated with the first TB.

In a twenty-fifth aspect, alone or in combination with one or more of the first through twenty-fourth aspects, the first state change comprises the retransmission based at least in part on a first NDI value associated with the first TB comprising a first specified value. In a twenty-sixth aspect, alone or in combination with one or more of the first through twenty-fifth aspects, the DCI transmission comprises a HARQ ID comprising a HARQ process ID value that indicates a HARQ process corresponding to the retransmission. In a twenty-seventh aspect, alone or in combination with one or more of the first through twenty-sixth aspects, the first state change comprises the retransmission based at least in part on a first pair of parameters associated with the first TB comprising a valid combination of parameter values. In a twenty-eighth aspect, alone or in combination with one or more of the first through twenty-seventh aspects, the first pair of parameters comprises a first RV value associated with the first TB and a first MCS value associated with the first TB.

In a twenty-ninth aspect, alone or in combination with one or more of the first through twenty-eighth aspects, the first state change comprises the retransmission based at least in part on a first NDI value associated with the first TB comprising a first specified value, and the second state change comprises an activation or a release based at least in part on at least one of a second NDI value associated with the second TB comprising a second specified value or a second pair of parameters associated with the second TB comprising at least one specified parameter value. In a thirtieth aspect, alone or in combination with one or more of the first through twenty-ninth aspects, the second pair of parameters comprises a RV value associated with the second TB and a MCS value associated with the second TB. In a thirty-first aspect, alone or in combination with one or more of the first through thirtieth aspects, the activation comprises a reactivation of the second TB based at least in part on the second pair of parameters.

In a thirty-second aspect, alone or in combination with one or more of the first through thirty-first aspects, the first state change comprises an activation associated with the first TB and the second state change comprises a release associated with the second TB. In a thirty-third aspect, alone or in combination with one or more of the first through thirty-second aspects, the first state change comprises the activation based at least in part on a first NDI value associated with the first TB comprising a specified NDI value, and the second state change comprises the release based at least in part on a second NDI value associated with the second TB comprising the specified value. In a thirty-fourth aspect, alone or in combination with one or more of the first through thirty-third aspects, the first state change comprises the activation based at least in part on a first RV value associated with the first TB comprising a specified RV value and the second state change comprises the release based at least in part on a second RV value, wherein the second RV value corresponds to the first RV value. In a thirty-fifth aspect, alone or in combination with one or more of the first through thirty-fourth aspects, the first state change comprises the activation based at least in part on a first MCS value associated with the first TB comprising an MCS value other than a specified MCS value, and the second state change comprises the release based at least in part on a second MCS value associated with the second TB comprising the specified MCS value.

In a thirty-sixth aspect, alone or in combination with one or more of the first through thirty-fifth aspects, scheduling information included in the DCI transmission is associated with only the first TB based at least in part on the second state change comprising the release. In a thirty-seventh aspect, alone or in combination with one or more of the first through thirty-sixth aspects, the second state change comprises a continuation state. In a thirty-eighth aspect, alone or in combination with one or more of the first through thirty-seventh aspects, a maximum quantity of TBs in the plurality of TBs is based at least in part on a radio resource control parameter corresponding to a dynamic grant.

In a thirty-ninth aspect, alone or in combination with one or more of the first through thirty-eighth aspects, a maximum quantity of TBs associated with a dynamic grant transmission corresponding to the dynamic grant is no smaller than the maximum quantity of TBs in the plurality of TBs. In a fortieth aspect, alone or in combination with one or more of the first through thirty-ninth aspects, a bitwidth of at least one field in a DCI format corresponding to the DCI transmission is based at least in part on the dynamic grant. In a forty-first aspect, alone or in combination with one or more of the first through fortieth aspects, a maximum quantity of TBs associated with a dynamic grant transmission corresponding to the dynamic grant is smaller than the maximum quantity of TBs in the plurality of TBs. In a forty-second aspect, alone or in combination with one or more of the first through forty-first aspects, a bitwidth of at least one field in a DCI format corresponding to the DCI transmission is based at least in part on a maximum bitwidth associated with the dynamic grant and the CG. In a forty-third aspect, alone or in combination with one or more of the first through forty-second aspects, a maximum quantity of TBs in the plurality of TBs is based at least in part on a radio resource control parameter corresponding to one or more CGs configured in a cell, wherein the one or more CGs includes the CG.

In a forty-fourth aspect, alone or in combination with one or more of the first through forty-third aspects, a maximum quantity of TBs in the plurality of TBs is based at least in part on a radio resource control parameter corresponding to the CG. In a forty-fifth aspect, alone or in combination with one or more of the first through forty-fourth aspects, the CG comprises a downlink SPS grant, and process 700 includes receiving a HARQ-ACK transmission based at least in part on the CG transmission. In a forty-sixth aspect, alone or in combination with one or more of the first through forty-fifth aspects, a quantity of bits associated with the CG and included in the HARQ-ACK transmission is based at least in part on a quantity of TBs activated in a control channel corresponding to the CG. In a forty-seventh aspect, alone or in combination with one or more of the first through forty-sixth aspects, a quantity of bits associated with the HARQ-ACK transmission is based at least in part on a maximum quantity of TBs configured for the CG.

In a forty-eighth aspect, alone or in combination with one or more of the first through forty-seventh aspects, the maximum quantity of TBs configured for the CG is two TBs, and the HARQ-ACK transmission includes two bits. In a forty-ninth aspect, alone or in combination with one or more of the first through forty-eighth aspects, a first TB of the plurality of TBs has a first priority that is higher than a second priority associated with a second TB based at least in part on a switch to a single-TB configuration corresponding to the CG based at least in part on an amount of data to be communicated using the CG. In a fiftieth aspect, alone or in combination with one or more of the first through forty-ninth aspects, the first priority is higher than the second priority based at least in part on a TB index value associated with the first TB being lower than a TB index value associated with the second. In a fifty-first aspect, alone or in combination with one or more of the first through fiftieth aspects, the first priority is higher than the second priority based at least in part on an MCS value associated with the first TB being higher than an MCS value associated with the second TB. In a fifty-second aspect, alone or in combination with one or more of the first through fifty-first aspects, the first priority is higher than the second priority based at least in part on a quantity of layers associated with the first TB being greater than a quantity of layers associated with the second TB based at least in part on the first priority being higher than the second priority.

In a fifty-third aspect, alone or in combination with one or more of the first through fifty-second aspects, process 700 includes transmitting a configuration comprising a dedicated parameter that indicates that the UE can switch to the single-TB configuration. In a fifty-fourth aspect, alone or in combination with one or more of the first through fifty-third aspects, process 700 includes receiving a HARQ-ACK transmission based at least in part on the CG transmission, wherein the HARQ-ACK transmission includes two bits based at least in part on switching to the single-TB configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
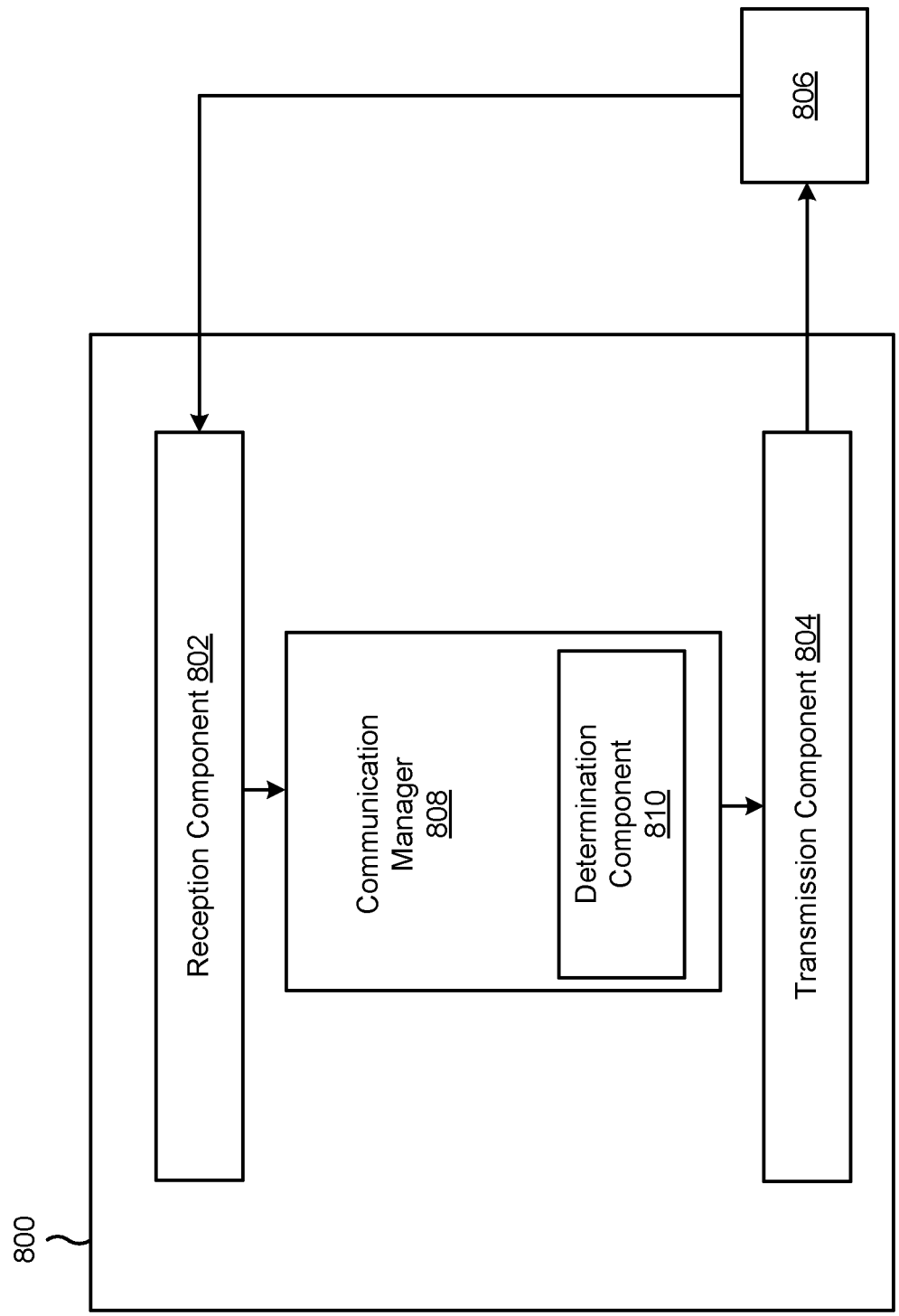
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 808. The communication manager 808 may include a determination component 810.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration corresponding to a CG, wherein the CG is associated with a CG transmission comprising a plurality of TBs. The reception component 802 may receive a DCI transmission comprising at least one state change indication corresponding to at least one state change associated with the CG transmission. The communication manager 808 may discard the DCI transmission based at least in part on the first pair of parameter values including at least one parameter value that is different from at least one parameter value of the second pair of parameter values. In some aspects, the communication manager 808 may include one or more antennas, a controller/processor, a memory, or a combination thereof, of the UE described in connection with FIG. 2. In some aspects, for example, the communication manager 808 may be, be similar to, include, or be included in, the communication manager 140 depicted in FIGS. 1 and 2. In some aspects, the communication manager 808 may include the reception component 802 and/or the transmission component 804.

The determination component 810 may determine a validation associated with the at least one state change indication based at least in part on at least one of the second RV value or the second MCS value comprising a validation value. In some aspects, the determination component 810 may include one or more antennas, a controller/processor, a memory, or a combination thereof, of the UE described in connection with FIG. 2. In some aspects, the determination component 810 may include the reception component 802 and/or the transmission component 804. The determination component 810 may determine a configuration index associated with the second TB based at least in part on a last physical downlink shared channel associated with the HARQ process. The determination component 810 may determine a first validity of the first TB and determining a second validity of the second TB.

The communication manager 808 may switch to a single-TB configuration corresponding to the CG based at least in part on an amount of data to be communicated using the CG. The reception component 802 may receive a configuration comprising a dedicated parameter that indicates that the UE can switch to the single-TB configuration. The communication manager 808 and/or the reception component 802 may perform, based at least in part on switching to the single-TB configuration, blind decoding on an additional CG transmission to determine a quantity of TBs transmitted. The transmission component 804 may transmit a HARQ-ACK transmission based at least in part on the CG transmission, wherein the HARQ-ACK transmission includes two bits based at least in part on switching to the single-TB configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
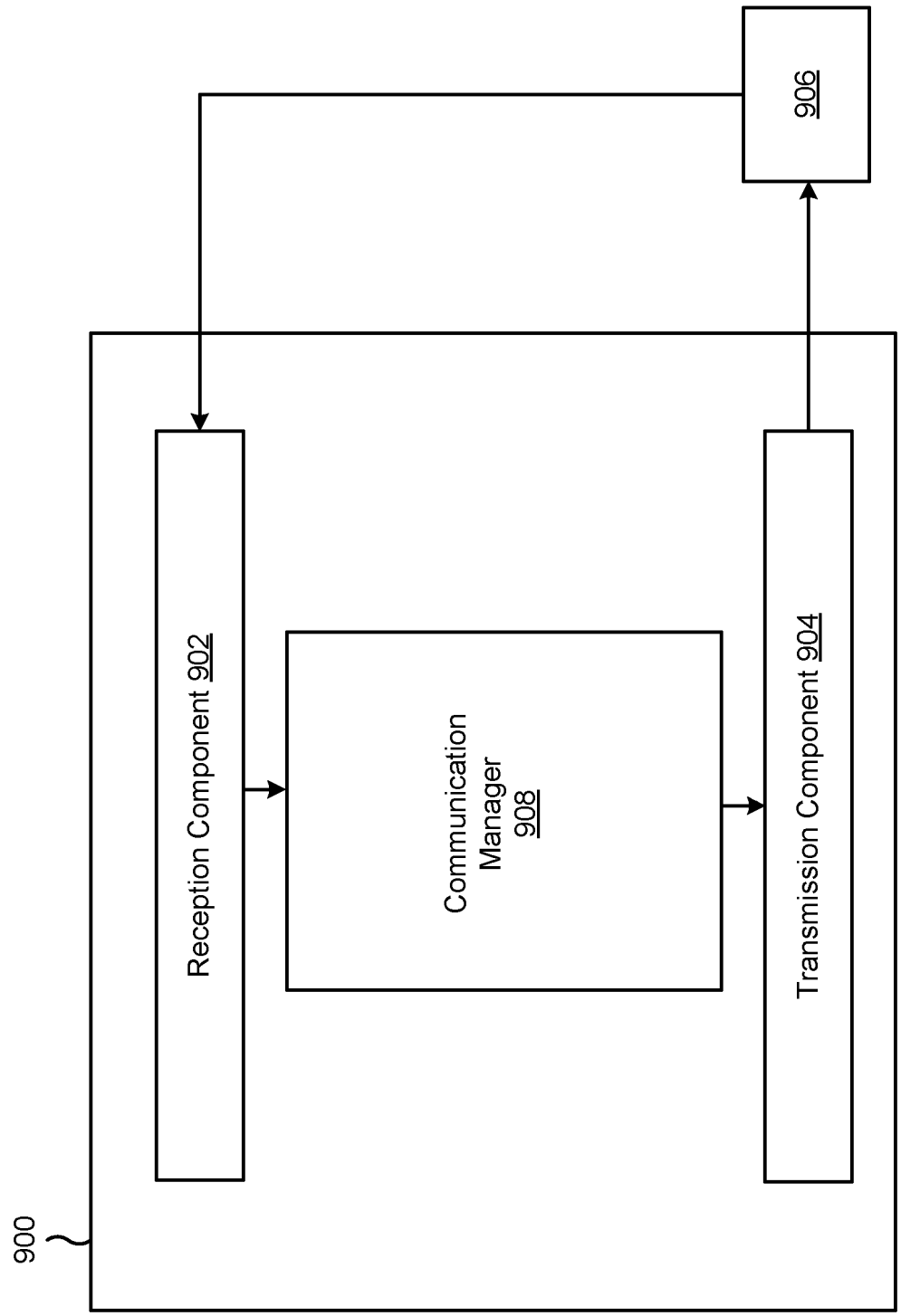

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include a communication manager 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 908 and/or the transmission component 904 may transmit a configuration corresponding to a CG, wherein the CG is associated with a CG transmission comprising a plurality of TBs. In some aspects, the communication manager 908 may include one or more antennas, a modem, a transmit processor, a controller/processor, a memory, or a combination thereof, of the network node described in connection with FIG. 2. In some aspects, the communication manager 908 may be, be similar to, include, or be included in, the communication manager 150 depicted in FIGS. 1 and 2.

The transmission component 904 may transmit a DCI transmission comprising at least one state change indication corresponding to at least one state change associated with the CG transmission. The transmission component 904 may transmit a configuration comprising a dedicated parameter that indicates that the UE can switch to the single-TB configuration. The reception component 902 may receive a HARQ-ACK transmission based at least in part on the CG transmission, wherein the HARQ-ACK transmission includes two bits based at least in part on switching to the single-TB configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a configuration corresponding to a configured grant (CG), wherein the CG is associated with a CG transmission comprising a plurality of transport blocks (TBs); and receiving a downlink control information (DCI) transmission comprising at least one state change indication corresponding to at least one state change associated with the CG transmission.

Aspect 2: The method of Aspect 1, wherein the CG comprises a downlink semi-persistent scheduling (SPS) grant.

Aspect 3: The method of either of Aspects 1 or 2, wherein the CG comprises an uplink CG.

Aspect 4: The method of any of Aspects 1-3, wherein the at least one state change indication comprises an indication of an activation associated with the CG transmission, a release associated with the CG transmission, or a retransmission associated with the CG transmission.

Aspect 5: The method of any of Aspects 1-4, wherein the DCI transmission comprises a first new data indicator (NDI) associated with a first TB of the plurality of TBs and a second NDI associated with a second TB of the plurality of TBs.

Aspect 6: The method of any of Aspects 1-5, wherein the at least one state change corresponds to the plurality of TBs, and wherein the at least one state change indication comprises a first new data indicator (NDI) value associated with a first TB of the plurality of TBs and a second NDI value associated with a second TB of the plurality of TBs.

Aspect 7: The method of Aspect 6, wherein the at least one state change indication indicates the state change associated with the CG transmission based at least in part on the first NDI value corresponding to the second NDI value.

Aspect 8: The method of Aspect 6, wherein the at least one state change indication fails to indicate the state change associated with the CG transmission based at least in part on the first NDI value being different than the second NDI value.

Aspect 9: The method of Aspect 6, wherein the at least one state change indication indicates the state change associated with the CG transmission based at least in part on the first NDI value comprising a specified value.

Aspect 10: The method of any of Aspects 1-9, wherein the at least one state change corresponds to the plurality of TBs, and wherein the at least one state change indication comprises at least one of a first redundancy version (RV) value associated with a first TB of the plurality of TBs and a second RV value associated with a second TB of the plurality of TBs.

Aspect 11: The method of Aspect 10, wherein the at least one state change indication indicates an activation associated with the CG transmission based at least in part on at least one of the first RV value or the second RV value comprising a specified value.

Aspect 12: The method of Aspect 11, wherein the first TB of the plurality of TBs is disabled based at least in part on a first pair of parameter values comprising a pair of specified values, wherein the first pair of parameter values comprises the first RV value and a first modulation and coding scheme value associated with the first TB.

Aspect 13: The method of either of Aspects 11 or 12, wherein the at least one state change indication indicates a quantity of TBs of the plurality of TBs that are activated.

Aspect 14: The method of any of Aspects 1-13, wherein the at least one state change corresponds to the plurality of TBs, and wherein the at least one state change indication comprises at least one of a first pair of parameter values or a second pair of parameter values, the first pair of parameter values comprising a first redundancy version (RV) value associated with a first TB of the plurality of TBs and a first modulation and coding scheme (MCS) value associated with the first TB, and the second pair of parameter values comprising a second RV value associated with a second TB of the plurality of TBs and a second MCS value associated with a second TB.

Aspect 15: The method of Aspect 14, wherein the at least one state change indication indicates a release associated with the CG transmission based at least in part on the first RV value corresponding to the second RV value and the first MCS value corresponding to the second MCS value.

Aspect 16: The method of Aspect 14, further comprising discarding the DCI transmission based at least in part on the first pair of parameter values including at least one parameter value that is different from at least one parameter value of the second pair of parameter values.

Aspect 17: The method of Aspect 14, wherein the at least one state change indication indicates a quantity of TBs of the plurality of TBs that are to be retransmitted.

Aspect 18: The method of any of Aspects 1-5, wherein the at least one state change corresponds to the plurality of TBs, and wherein the at least one state change indication comprises a first pair of parameter values of a plurality of pairs of parameter values, the plurality of pairs of parameter values further comprising a second pair of parameter values, wherein the first pair of parameter values comprises a first redundancy version (RV) value associated with a first TB of the plurality of TBs and a first modulation and coding scheme (MCS) value associated with the first TB, and wherein the second pair of parameter values comprises a second RV value associated with a second TB of the plurality of TBs and a second MCS value associated with a second TB.

Aspect 19: The method of Aspect 18, wherein the at least one state change indication indicates a release associated with the CG transmission based at least in part on at least one of the first RV value or the first MCS value comprising a specified value.

Aspect 20: The method of Aspect 19, further comprising determining a validation associated with the at least one state change indication based at least in part on at least one of the second RV value or the second MCS value comprising a validation value.

Aspect 21: The method of either of Aspects 19 or 20, wherein the first TB is enabled and wherein the second TB is disabled.

Aspect 22: The method of any of Aspects 1-21, wherein the at least one state change corresponds to the plurality of TBs, and wherein the DCI transmission indicates a same state change for each TB of the plurality of TBs.

Aspect 23: The method of any of Aspects 1-22, wherein the DCI transmission corresponds to a first quantity of TBs of the plurality of TBs, the method further comprising receiving an additional DCI transmission that reactivates the CG based at least in part on updated scheduling information, wherein the additional DCI transmission corresponds to a second quantity of TBs of the plurality of TBs, and wherein the second quantity is different from the first quantity.

Aspect 24: The method of Aspect 1, wherein the at least one state change indication comprises a first state change indication corresponding to a first TB of the plurality of TBs and a second state change indication corresponding to a second TB of the plurality of TBs.

Aspect 25: The method of Aspect 24, wherein the first state change indication indicates a first state change associated with the first TB and a second state change associated with the second TB, wherein the second state change is different from the first state change.

Aspect 26: The method of Aspect 25, wherein the first state change indication indicates the first state change based at least in part on at least one of a first new data indicator (NDI) value associated with the first TB, a first redundancy version (RV) value associated with the first TB, or a first modulation and coding scheme (MCS) value associated with the first TB; and wherein the second state change indication indicates the second state change based at least in part on at least one of a second NDI value associated with the second TB, a second RV value associated with the second TB, or a second MCS value associated with the second TB.

Aspect 27: The method of Aspect 25, wherein the first state change comprises a retransmission associated with the first TB.

Aspect 28: The method of Aspect 27, wherein the first state change comprises the retransmission based at least in part on a first new data indicator (NDI) value associated with the first TB comprising a first specified value.

Aspect 29: The method of Aspect 28, wherein the DCI transmission comprises a hybrid automatic repeat request (HARQ) process identifier (ID) comprising a HARQ process ID value that indicates a HARQ process corresponding to the retransmission.

Aspect 30: The method of Aspect 29, further comprising determining a configuration index associated with the second TB based at least in part on a last physical downlink shared channel associated with the HARQ process.

Aspect 31: The method of Aspect 27, wherein the first state change comprises the retransmission based at least in part on a first pair of parameters associated with the first TB comprising a valid combination of parameter values.

Aspect 32: The method of Aspect 31, wherein the first pair of parameters comprises a first redundancy version (RV) value associated with the first TB and a first modulation and coding scheme (MCS) value associated with the first TB.

Aspect 33: The method of Aspect 27, wherein the first state change comprises the retransmission based at least in part on a first new data indicator (NDI) value associated with the first TB comprising a first specified value, and wherein the second state change comprises an activation or a release based at least in part on at least one of a second NDI value associated with the second TB comprising a second specified value or a second pair of parameters associated with the second TB comprising at least one specified parameter value.

Aspect 34: The method of Aspect 33, wherein the second pair of parameters comprises a redundancy version (RV) value associated with the second TB and a modulation and coding scheme (MCS) value associated with the second TB.

Aspect 35: The method of either of Aspects 33 or 34, wherein the activation comprises a reactivation of the second TB based at least in part on the second pair of parameters.

Aspect 36: The method of Aspect 25, wherein the first state change comprises an activation associated with the first TB and the second state change comprises a release associated with the second TB.

Aspect 37: The method of Aspect 36, wherein the first state change comprises the activation based at least in part on a first new data indicator (NDI) value associated with the first TB comprising a specified NDI value, and wherein the second state change comprises the release based at least in part on a second NDI value associated with the second TB comprising the specified value.

Aspect 38: The method of Aspect 37, wherein the first state change comprises the activation based at least in part on a first redundancy version (RV) value associated with the first TB comprising a specified RV value and wherein the second state change comprises the release based at least in part on a second RV value, wherein the second RV value corresponds to the first RV value.

Aspect 39: The method of either of Aspects 37 or 38, wherein the first state change comprises the activation based at least in part on a first modulation and coding scheme (MCS) value associated with the first TB comprising an MCS value other than a specified MCS value, and wherein the second state change comprises the release based at least in part on a second MCS value associated with the second TB comprising the specified MCS value.

Aspect 40: The method of Aspect 37, wherein scheduling information included in the DCI transmission is associated with only the first TB based at least in part on the second state change comprising the release.

Aspect 41: The method of any of Aspects 25-41, further comprising determining a first validity of the first TB and determining a second validity of the second TB.

Aspect 42: The method of any of Aspects 25-41, wherein the second state change comprises a continuation state.

Aspect 43: The method of any of Aspects 1-42, wherein a maximum quantity of TBs in the plurality of TBs is based at least in part on a radio resource control parameter corresponding to a dynamic grant.

Aspect 44: The method of Aspect 43, wherein a maximum quantity of TBs associated with a dynamic grant transmission corresponding to the dynamic grant is no smaller than the maximum quantity of TBs in the plurality of TBs.

Aspect 45: The method of Aspect 44, wherein a bitwidth of at least one field in a DCI format corresponding to the DCI transmission is based at least in part on the dynamic grant.

Aspect 46: The method of Aspect 43, wherein a maximum quantity of TBs associated with a dynamic grant transmission corresponding to the dynamic grant is smaller than the maximum quantity of TBs in the plurality of TBs.

Aspect 47: The method of Aspect 46, wherein a bitwidth of at least one field in a DCI format corresponding to the DCI transmission is based at least in part on a maximum bitwidth associated with the dynamic grant and the CG.

Aspect 48: The method of any of Aspects 1-47, wherein a maximum quantity of TBs in the plurality of TBs is based at least in part on a radio resource control parameter corresponding to one or more CGs configured in a cell, wherein the one or more CGs includes the CG.

Aspect 49: The method of any of Aspects 1-47, wherein a maximum quantity of TBs in the plurality of TBs is based at least in part on a radio resource control parameter corresponding to the CG.

Aspect 50: The method of any of Aspects 1-49, wherein the CG comprises a downlink semi-persistent scheduling (SPS) grant, the method further comprising transmitting a hybrid automatic repeat request (HARD) acknowledgement (HARQ-ACK) transmission based at least in part on the CG transmission.

Aspect 51: The method of Aspect 50, wherein a quantity of bits associated with the CG and included in the HARQ-ACK transmission is based at least in part on a quantity of TBsactivated in a control channel corresponding to the CG.

Aspect 52: The method of either of Aspects 50 or 51, wherein a quantity of bits associated with the HARQ-ACK transmission is based at least in part on a maximum quantity of TBs configured for the CG.

Aspect 53: The method of Aspect 52, wherein the maximum quantity of TBs configured for the CG is two TBs, and wherein the HARQ-ACK transmission includes two bits.

Aspect 54: The method of any of Aspects 1-53, further comprising switching to a single-TB configuration corresponding to the CG based at least in part on an amount of data to be communicated using the CG.

Aspect 55: The method of Aspect 54, wherein a first TB of the plurality of TBs has a first priority that is higher than a second priority associated with a second TB based at least in part on switching to the single-TB configuration.

Aspect 56: The method of Aspect 55, wherein the first priority is higher than the second priority based at least in part on a TB index value associated with the first TB being lower than a TB index value associated with the second TB.

Aspect 57: The method of either of Aspects 55 or 56, wherein the first priority is higher than the second priority based at least in part on a modulation and coding scheme (MCS) value associated with the first TB being higher than an MCS value associated with the second TB.

Aspect 58: The method of any of Aspects 55-57, wherein the first priority is higher than the second priority based at least in part on a quantity of layers associated with the first TB being greater than a quantity of layers associated with the second TB.

Aspect 59: The method of any of Aspects 55-58, further comprising receiving a configuration comprising a dedicated parameter that indicates that the UE can switch to the single-TB configuration.

Aspect 60: The method of any of Aspects 54-59, further comprising performing, based at least in part on switching to the single-TB configuration, blind decoding on an additional CG transmission to determine a quantity of TBs transmitted.

Aspect 61: The method of any of Aspects 54-60, further comprising transmitting a hybrid automatic repeat request (HARQ) acknowledgement (HARQ-ACK) transmission based at least in part on the CG transmission, wherein the HARQ-ACK transmission includes two bits based at least in part on switching to the single-TB configuration.

Aspect 62: A method of wireless communication performed by a network node, comprising: transmitting a configuration corresponding to a configured grant (CG), wherein the CG is associated with a CG transmission comprising a plurality of transport blocks (TBs); and transmitting a downlink control information (DCI) transmission comprising at least one state change indication corresponding to at least one state change associated with the CG transmission.

Aspect 63: The method of Aspect 62, wherein the CG comprises a downlink semi-persistent scheduling (SPS) grant.

Aspect 64: The method of either of Aspects 62 or 63, wherein the CG comprises an uplink CG.

Aspect 65: The method of any of Aspects 62-64, wherein the at least one state change indication comprises an indication of an activation associated with the CG transmission, a release associated with the CG transmission, or a retransmission associated with the CG transmission.

Aspect 66: The method of any of Aspects 62-64, wherein the DCI transmission comprises a first new data indicator (NDI) associated with a first TB of the plurality of TBs and a second NDI associated with a second TB of the plurality of TBs.

Aspect 67: The method of any of Aspects 62-64, wherein the at least one state change corresponds to the plurality of TBs, and wherein the at least one state change indication comprises a first new data indicator (NDI) value associated with a first TB of the plurality of TBs and a second NDI value associated with a second TB of the plurality of TBs.

Aspect 68: The method of Aspect 67, wherein the at least one state change indication indicates the state change associated with the CG transmission based at least in part on the first NDI value corresponding to the second NDI value.

Aspect 69: The method of Aspect 67, wherein the at least one state change indication fails to indicate the state change associated with the CG transmission based at least in part on the first NDI value being different than the second NDI value.

Aspect 70: The method of Aspect 67, wherein the at least one state change indication indicates the state change associated with the CG transmission based at least in part on the first NDI value comprising a specified value.

Aspect 71: The method of any of Aspects 62-70, wherein the at least one state change corresponds to the plurality of TBs, and wherein the at least one state change indication comprises at least one of a first redundancy version (RV) value associated with a first TB of the plurality of TBs and a second RV value associated with a second TB of the plurality of TBs.

Aspect 72: The method of Aspect 71, wherein the at least one state change indication indicates an activation associated with the CG transmission based at least in part on at least one of the first RV value or the second RV value comprising a specified value.

Aspect 73: The method of Aspect 72, wherein the first TB of the plurality of TBs is disabled based at least in part on a first pair of parameter values comprising a pair of specified values, wherein the first pair of parameter values comprises the first RV value and a first modulation and coding scheme value associated with the first TB.

Aspect 74: The method of Aspect 72, wherein the at least one state change indication indicates a quantity of TBs of the plurality of TBs that are activated.

Aspect 75: The method of Aspect 62, wherein the at least one state change corresponds to the plurality of TBs, and wherein the at least one state change indication comprises at least one of a first pair of parameter values or a second pair of parameter values, the first pair of parameter values comprising a first redundancy version (RV) value associated with a first TB of the plurality of TBs and a first modulation and coding scheme (MCS) value associated with the first TB, and the second pair of parameter values comprising a second RV value associated with a second TB of the plurality of TBs and a second MCS value associated with a second TB.

Aspect 76: The method of Aspect 75, wherein the at least one state change indication indicates a release associated with the CG transmission based at least in part on the first RV value corresponding to the second RV value and the first MCS value corresponding to the second MCS value.

Aspect 77: The method of either of Aspects 75 or 76, wherein the at least one state change indication indicates a quantity of TBs of the plurality of TBs that are to be retransmitted.

Aspect 78: The method of Aspect 62, wherein the at least one state change corresponds to the plurality of TBs, and wherein the at least one state change indication comprises a first pair of parameter values of a plurality of pairs of parameter values, the plurality of pairs of parameter values further comprising a second pair of parameter values, wherein the first pair of parameter values comprises a first redundancy version (RV) value associated with a first TB of the plurality of TBs and a first modulation and coding scheme (MCS) value associated with the first TB, and wherein the second pair of parameter values comprises a second RV value associated with a second TB of the plurality of TBs and a second MCS value associated with a second TB.

Aspect 79: The method of Aspect 78, wherein the at least one state change indication indicates a release associated with the CG transmission based at least in part on at least one of the first RV value or the first MCS value comprising a specified value.

Aspect 80: The method of Aspect 79, wherein the first TB is enabled and wherein the second TB is disabled.

Aspect 81: The method of any of Aspects 62-80, wherein the at least one state change corresponds to the plurality of TBs, and wherein the DCI transmission indicates a same state change for each TB of the plurality of TBs.

Aspect 82: The method of any of Aspects 62-64, wherein the DCI transmission corresponds to a first quantity of TBs of the plurality of TB s, the method further comprising transmitting an additional DCI transmission that reactivates the CG based at least in part on updated scheduling information, wherein the additional DCI transmission corresponds to a second quantity of TBs of the plurality of TBs, and wherein the second quantity is different from the first quantity.

Aspect 83: The method of any of Aspects 62-64, wherein the at least one state change indication comprises a first state change indication corresponding to a first TB of the plurality of TBs and a second state change indication corresponding to a second TB of the plurality of TBs.

Aspect 84: The method of Aspect 83, wherein the first state change indication indicates a first state change associated with the first TB and a second state change associated with the second TB, wherein the second state change is different from the first state change.

Aspect 85: The method of Aspect 84, wherein the first state change indication indicates the first state change based at least in part on at least one of a first new data indicator (NDI) value associated with the first TB, a first redundancy version (RV) value associated with the first TB, or a first modulation and coding scheme (MCS) value associated with the first TB; and wherein the second state change indication indicates the second state change based at least in part on at least one of a second NDI value associated with the second TB, a second RV value associated with the second TB, or a second MCS value associated with the second TB.

Aspect 86: The method of either of Aspects 84 or 85, wherein the first state change comprises a retransmission associated with the first TB.

Aspect 87: The method of Aspect 86, wherein the first state change comprises the retransmission based at least in part on a first new data indicator (NDI) value associated with the first TB comprising a first specified value.

Aspect 88: The method of Aspect 87, wherein the DCI transmission comprises a hybrid automatic repeat request (HARQ) process identifier (ID) comprising a HARQ process ID value that indicates a HARQ process corresponding to the retransmission.

Aspect 89: The method of Aspect 86, wherein the first state change comprises the retransmission based at least in part on a first pair of parameters associated with the first TB comprising a valid combination of parameter values.

Aspect 90: The method of Aspect 89, wherein the first pair of parameters comprises a first redundancy version (RV) value associated with the first TB and a first modulation and coding scheme (MCS) value associated with the first TB.

Aspect 91: The method of Aspect 86, wherein the first state change comprises the retransmission based at least in part on a first new data indicator (NDI) value associated with the first TB comprising a first specified value, and wherein the second state change comprises an activation or a release based at least in part on at least one of a second NDI value associated with the second TB comprising a second specified value or a second pair of parameters associated with the second TB comprising at least one specified parameter value.

Aspect 92: The method of Aspect 91, wherein the second pair of parameters comprises a redundancy version (RV) value associated with the second TB and a modulation and coding scheme (MCS) value associated with the second TB.

Aspect 93: The method of either of Aspects 91 or 92, wherein the activation comprises a reactivation of the second TB based at least in part on the second pair of parameters.

Aspect 94: The method of Aspect 84, wherein the first state change comprises an activation associated with the first TB and the second state change comprises a release associated with the second TB.

Aspect 95: The method of Aspect 94, wherein the first state change comprises the activation based at least in part on a first new data indicator (NDI) value associated with the first TB comprising a specified NDI value, and wherein the second state change comprises the release based at least in part on a second NDI value associated with the second TB comprising the specified value.

Aspect 96: The method of Aspect 95, wherein the first state change comprises the activation based at least in part on a first redundancy version (RV) value associated with the first TB comprising a specified RV value and wherein the second state change comprises the release based at least in part on a second RV value, wherein the second RV value corresponds to the first RV value.

Aspect 97: The method of Aspect 95, wherein the first state change comprises the activation based at least in part on a first modulation and coding scheme (MCS) value associated with the first TB comprising an MCS value other than a specified MCS value, and wherein the second state change comprises the release based at least in part on a second MCS value associated with the second TB comprising the specified MCS value.

Aspect 98: The method of any of Aspects 95-97, wherein scheduling information included in the DCI transmission is associated with only the first TB based at least in part on the second state change comprising the release.

Aspect 99: The method of any of Aspects 84-98, wherein the second state change comprises a continuation state.

Aspect 100: The method of any of Aspects 62-99, wherein a maximum quantity of TBs in the plurality of TBs is based at least in part on a radio resource control parameter corresponding to a dynamic grant.

Aspect 101: The method of Aspect 100, wherein a maximum quantity of TBs associated with a dynamic grant transmission corresponding to the dynamic grant is no smaller than the maximum quantity of TBs in the plurality of TBs.

Aspect 102: The method of Aspect 101, wherein a bit-width of at least one field in a DCI format corresponding to the DCI transmission is based at least in part on the dynamic grant.

Aspect 103: The method of either of Aspects 101 or 102, wherein a maximum quantity of TBs associated with a dynamic grant transmission corresponding to the dynamic grant is smaller than the maximum quantity of TBs in the plurality of TBs.

Aspect 104: The method of Aspect 103, wherein a bit-width of at least one field in a DCI format corresponding to the DCI transmission is based at least in part on a maximum bitwidth associated with the dynamic grant and the CG.

Aspect 105: The method of any of Aspects 62-104, wherein a maximum quantity of TBs in the plurality of TBs is based at least in part on a radio resource control parameter corresponding to one or more CGs configured in a cell, wherein the one or more CGs includes the CG.

Aspect 106: The method of any of Aspects 62-105, wherein a maximum quantity of TBs in the plurality of TBs is based at least in part on a radio resource control parameter corresponding to the CG.

Aspect 107: The method of any of Aspects 62-106, wherein the CG comprises a downlink semi-persistent scheduling (SPS) grant, the method further comprising receiving a hybrid automatic repeat request (HARQ) acknowledgement (HARQ-ACK) transmission based at least in part on the CG transmission.

Aspect 108: The method of Aspect 107, wherein a quantity of bits associated with the CG and included in the HARQ-ACK transmission is based at least in part on a quantity of TBs activated in a control channel corresponding to the CG.

Aspect 109: The method of either of Aspects 107 or 108, wherein a quantity of bits associated with the HARQ-ACK transmission is based at least in part on a maximum quantity of TBs configured for the CG.

Aspect 110: The method of Aspect 109, wherein the maximum quantity of TBs configured for the CG is two TBs, and wherein the HARQ-ACK transmission includes two bits.

Aspect 111: The method of any of Aspects 62-110, wherein a first TB of the plurality of TBs has a first priority that is higher than a second priority associated with a second TB based at least in part on a switch to a single-TB configuration corresponding to the CG based at least in part on an amount of data to be communicated using the CG.

Aspect 112: The method of Aspect 111, wherein the first priority is higher than the second priority based at least in part on a TB index value associated with the first TB being lower than a TB index value associated with the second TB.

Aspect 113: The method of either of Aspects 111 or 112, wherein the first priority is higher than the second priority based at least in part on a modulation and coding scheme (MCS) value associated with the first TB being higher than an MCS value associated with the second TB.

Aspect 114: The method of any of Aspects 111-113, wherein the first priority is higher than the second priority based at least in part on a quantity of layers associated with the first TB being greater than a quantity of layers associated with the second TB.

Aspect 115: The method of any of Aspects 111-114, further comprising transmitting a configuration comprising a dedicated parameter that indicates that the UE can switch to the single-TB configuration.

Aspect 116: The method of any of Aspects 111-115, further comprising receiving a hybrid automatic repeat request (HARQ) acknowledgement (HARQ-ACK) transmission based at least in part on the CG transmission, wherein the HARQ-ACK transmission includes two bits based at least in part on switching to the single-TB configuration.

Aspect 117: An apparatus for wireless communication at a device, comprising a processor; memory coupled with the processor; and instructions stored in the memory and executable by the processor to cause the apparatus to perform the method of one or more of Aspects 1-61.

Aspect 118: A device for wireless communication, comprising a memory and one or more processors coupled to the memory, the one or more processors configured to perform the method of one or more of Aspects 1-61.

Aspect 119: An apparatus for wireless communication, comprising at least one means for performing the method of one or more of Aspects 1-61.

Aspect 120: A non-transitory computer-readable medium storing code for wireless communication, the code comprising instructions executable by a processor to perform the method of one or more of Aspects 1-61.

Aspect 121: A non-transitory computer-readable medium storing a set of instructions for wireless communication, the set of instructions comprising one or more instructions that, when executed by one or more processors of a device, cause the device to perform the method of one or more of Aspects 1-61.

Aspect 122: An apparatus for wireless communication at a device, comprising a processor; memory coupled with the processor; and instructions stored in the memory and executable by the processor to cause the apparatus to perform the method of one or more of Aspects 62-116.

Aspect 123: A device for wireless communication, comprising a memory and one or more processors coupled to the memory, the one or more processors configured to perform the method of one or more of Aspects 62-116.

Aspect 124: An apparatus for wireless communication, comprising at least one means for performing the method of one or more of Aspects 62-116.

Aspect 125: A non-transitory computer-readable medium storing code for wireless communication, the code comprising instructions executable by a processor to perform the method of one or more of Aspects 62-116.

Aspect 126: A non-transitory computer-readable medium storing a set of instructions for wireless communication, the set of instructions comprising one or more instructions that, when executed by one or more processors of a device, cause the device to perform the method of one or more of Aspects 62-116.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  receiving a configuration corresponding to a configured grant (CG), wherein the CG is associated with a CG transmission comprising a plurality of transport blocks (TBs); and receiving a downlink control information (DCI) transmission comprising at least one state change indication corresponding to at least one state change associated with the CG transmission;
  wherein the at least one state change corresponds to the plurality of TBs, and wherein the at least one state change indication comprises a first new data indicator (NDI) value associated with a first TB of the plurality of TBs and a second NDI value associated with a second TB of the plurality of TBs, wherein the at least one state change indication fails to indicate the state change associated with the CG transmission based at least in part on the first NDI value being different than the second NDI value.

2. The method of claim 1, wherein the CG comprises a downlink semi-persistent scheduling (SPS) grant.

3. The method of claim 1, wherein the CG comprises an uplink CG.

4. The method of claim 1, wherein the at least one state change indication comprises an indication of an activation associated with the CG transmission, a release associated with the CG transmission, or a retransmission associated with the CG transmission.

5. A method of wireless communication performed by a user equipment (UE), comprising:
  receiving a configuration corresponding to a configured grant (CG), wherein the CG is associated with a CG transmission comprising a plurality of transport blocks (TBs); and
  receiving a downlink control information (DCI) transmission comprising at least one state change indication corresponding to at least one state change associated with the CG transmission,
  wherein the at least one state change corresponds to the plurality of TBs, and wherein the at least one state change indication comprises at least one of a first pair of parameter values or a second pair of parameter values, the first pair of parameter values comprising a first redundancy version (RV) value associated with a first TB of the plurality of TBs and a first modulation and coding scheme (MCS) value associated with the first TB, and the second pair of parameter values comprising a second RV value associated with a second TB of the plurality of TBs and a second MCS value associated with a second TB.

6. The method of claim 5, wherein the at least one state change indication indicates a release associated with the CG transmission based at least in part on the first RV value corresponding to the second RV value and the first MCS value corresponding to the second MCS value.

7. The method of claim 5, further comprising discarding the DCI transmission based at least in part on the first pair of parameter values including at least one parameter value that is different from at least one parameter value of the second pair of parameter values.

8. The method of claim 5, wherein the at least one state change indication indicates a quantity of TBs of the plurality of TBs that are to be retransmitted.

9. A method of wireless communication performed by a user equipment (UE), comprising:
  receiving a configuration corresponding to a configured grant (CG), wherein the CG is associated with a CG transmission comprising a plurality of transport blocks (TBs); and
  receiving a downlink control information (DCI) transmission comprising at least one state change indication corresponding to at least one state change associated with the CG transmission,
  wherein the DCI transmission corresponds to a first quantity of TBs of the plurality of TBs, the method further comprising receiving an additional DCI transmission that reactivates the CG based at least in part on updated scheduling information, wherein the additional DCI transmission corresponds to a second quantity of TBs of the plurality of TBs, and wherein the second quantity is different from the first quantity.

10. A method of wireless communication performed by a network node, comprising:
  transmitting a configuration corresponding to a configured grant (CG), wherein the CG is associated with a CG transmission comprising a plurality of transport blocks (TBs); and
  transmitting a downlink control information (DCI) transmission comprising at least one state change indication corresponding to at least one state change associated with the CG transmission,
  wherein the at least one state change corresponds to the plurality of TBs, and wherein the at least one state change indication comprises a first new data indicator (NDI) value associated with a first TB of the plurality of TBs and a second NDI value associated with a second TB of the plurality of TBs, wherein the at least one state change indication fails to indicate the state change associated with the CG transmission based at least in part on the first NDI value being different than the second NDI value.

11. The method of claim 10, wherein the CG comprises a downlink semi-persistent scheduling (SPS) grant.

12. The method of claim 10, wherein the CG comprises an uplink CG.

13. The method of claim 10, wherein the at least one state change indication comprises an indication of an activation associated with the CG transmission, a release associated with the CG transmission, or a retransmission associated with the CG transmission.

14. A user equipment (UE) for wireless communication, comprising:
  a memory; and
  one or more processors, coupled to the memory, configured to:
    receive a configuration corresponding to a configured grant (CG), wherein the CG is associated with a CG transmission comprising a plurality of transport blocks (TBs); and
    receive a downlink control information (DCI) transmission comprising at least one state change indication corresponding to at least one state change associated with the CG transmission;
    wherein the at least one state change corresponds to the plurality of TBs, and wherein the at least one state change indication comprises a first new data indicator (NDI) value associated with a first TB of the plurality of TBs and a second NDI value associated with a second TB of the plurality of TBs, wherein the at least one state change indication fails to indicate the state change associated with the CG transmission based at least in part on the first NDI value being different than the second NDI value.

15. A user equipment (UE) for wireless communication, comprising:
  a memory; and one or more processors, coupled to the memory, configured to:
- receiving a configuration corresponding to a configured grant (CG), wherein the CG is associated with a CG transmission comprising a plurality of transport blocks (TBs); and
- receiving a downlink control information (DCI) transmission comprising at least one state change indication corresponding to at least one state change associated with the CG transmission,
- wherein the DCI transmission corresponds to a first quantity of TBs of the plurality of TBs, the method further comprising receiving an additional DCI transmission that reactivates the CG based at least in part on updated scheduling information, wherein the additional DCI transmission corresponds to a second quantity of TBs of the plurality of TBs, and wherein the second quantity is different from the first quantity.

* * * * *